(12) United States Patent
Uehara et al.

(10) Patent No.: US 7,066,468 B2
(45) Date of Patent: Jun. 27, 2006

(54) SHAFT SEAL AND GAS TURBINE

(75) Inventors: Hidekazu Uehara, Takasago (JP); Tanehiro Shinohara, Takasago (JP); Kouichi Akagi, Takasago (JP); Masanori Yuri, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 421 days.

(21) Appl. No.: 09/983,881

(22) Filed: Oct. 26, 2001

(65) Prior Publication Data

US 2002/0105146 A1 Aug. 8, 2002

(30) Foreign Application Priority Data

Feb. 8, 2001 (JP) .................... 2001-032132

(51) Int. Cl.
*F16J 15/44* (2006.01)

(52) U.S. Cl. ................................................. 277/355
(58) Field of Classification Search ................ 277/355, 277/409, 411, 412, 413, 421, 422
See application file for complete search history.

(56) References Cited

U.S. PATENT DOCUMENTS

| | | | | |
|---|---|---|---|---|
| 5,031,922 A | * | 7/1991 | Heydrich | 277/355 |
| 5,042,823 A | * | 8/1991 | Mackay et al. | 277/355 |
| 5,054,823 A | * | 10/1991 | Arnoldt | 285/363 |
| 5,135,237 A | | 8/1992 | Flower | |
| 5,568,931 A | * | 10/1996 | Tseng et al. | 277/355 |
| 5,884,918 A | * | 3/1999 | Basu et al. | 277/355 |
| 6,196,550 B1 | * | 3/2001 | Arora et al. | 277/355 |
| 6,267,381 B1 | * | 7/2001 | Wright | 277/355 |
| 6,293,554 B1 | * | 9/2001 | Dinc et al. | 277/355 |
| 6,457,719 B1 | * | 10/2002 | Fellenstein et al. | 277/355 |
| 2001/0004145 A1 | * | 6/2001 | Wright et al. | 277/355 |

FOREIGN PATENT DOCUMENTS

| | | |
|---|---|---|
| EP | 0 933 567 | 8/1999 |
| EP | 1 013 975 A1 | 6/2000 |
| FR | 2 650 048 | 1/1991 |
| GB | 2 286 434 | 8/1995 |
| JP | 10-196801 | 7/1998 |

* cited by examiner

*Primary Examiner*—Vishal Patel
(74) *Attorney, Agent, or Firm*—Oblon, Spivak, McClelland, Maier & Neustadt, P.C.

(57) ABSTRACT

An object of the present invention is to provide a shaft seal which reduces the leakage of gas from the high pressure side to the low pressure side, and has excellent corrosion-resistance, and a gas turbine which is equipped with the shaft seal; in order to achieve the object, the present invention provide a shaft seal comprising a plurality of flexible thin plates having width in the axial direction of a rotary shaft, tips thereof sliding against a peripheral face of said rotary shaft, and outer peripheral bases thereof being secured to a casing side maintaining a gap therebetween, said thin plates being laminated in the peripheral direction of said rotary shaft, enabling the outer periphery of said rotary shaft to be sealed, an acute angle being formed between the thin plates and the peripheral face of said rotary shaft; and a low pressure side side-plate and a high pressure side side-plate which are provided on both sides of said thin plates in the axial direction of said rotary shaft, wherein it further comprises a gas pressure adjusting mechanism, which when said thin plates are viewed cross-sectionally along an imaginary plane which is perpendicular to the direction of their width, the face of each thin plate which faces the rotary shaft is deemed a bottom face and the rear side is deemed a top face, and gas pressure from said high pressure side side-plate to said low pressure side side-plate is applied to said thin plates, ensures that the gas pressure applied to said bottom faces is higher than the gas pressure applied to said top faces at a given point along said cross-sectional face of said thin plates, and a gas turbine comprising such shaft seal.

8 Claims, 17 Drawing Sheets

HIGH PRESSURE SIDE

LOW PRESSURE SIDE

ROTATION DIRECTION

SHAFT SEAL AND GAS TURBINE

BACKGROUND OF THE INVENTION

1. Field of the Invention

The present invention relates to a shaft seal which is used in a rotary shaft and the like of a large-scale fluid machine, such as a gas turbine, a steam turbine, a compressor, a waterwheel, a refrigerator, and a pump. In particular, the present invention relates to a gas turbine which leads gas of high temperature and high pressure into a turbine, expands the gas therein, and generates dynamic force by converting thermal energy of the gas to mechanical rotation energy, and a shaft seal which is suitably used in a shaft comprising the gas turbine.

2. Description of the Related Art

In a gas turbine, a shaft seal for reducing the amount of gas which leaks from the high pressure side to the low pressure side is provided between stationary blades and the rotary shaft. As this shaft seal, a non-contacting labyrinth seal has been widely used. However, in this labyrinth seal, the gap between the tips of the fins must be increased by a certain amount so that the tips of the fins do not contact due to an axial vibration or an excessive thermal deformation during transient rotation. Consequently, a large amount of gas is leaked. Instead of this labyrinth seal, a brush seal has been developed with the aim of reducing the amount of leakage.

FIGS. 16A and 16B are schematic diagrams showing the constitution of this type of brush seal. In FIGS. 16A and 16B, reference numeral 1 represents a rotary shaft, reference numeral 2 represents a casing, reference numeral 3 represents a low pressure side side-plate, reference numeral 4 represents a high pressure side side-plate, reference numeral 5 represents a brazing section, and reference numeral 6 represents wires. The wires 6 is made of filaments which have a diameter of 50 to 100 μm and are flexible enough to be able to absorb decentering caused the vibration of the rotary shaft 1 or by thermal deformation. The wires 6 are bundled tightly into a bundle having a width of 3 to 5 mm so that there are no gaps between them. Furthermore, the wires 6 are attached at a gradient to the direction of rotation so as to form an acute angle with the outer periphery of the rotary shaft 1. The tips of the wires 6 touch the outer periphery of the rotary shaft 1 with a predetermined preliminary pressure, thereby reducing the amount of leakage in the axial direction.

The wires 6 slide against the rotary shaft 1 while contacting, generating heat dependent on atmospheric conditions or peripheral speed and becoming red-hot. For this reason, a material which is resistance to high temperatures, such as INCONEL alloy or HASTELLOY alloy, is used for the wires 6 in accordance with the conditions of use. Since the sliding face on the outer rim of the rotary shaft 1 is corroded together with the wires 6, it is coated with a corrosion-resistant material. Moreover, since the wires 6 have little flexibility in the axial direction of the rotary shaft 1, the wires 6 are prevented from being damaged by making the inside diameter of the low pressure side side-plate 3 substantially equal to the outer rim of the rotary shaft 1.

In addition, a leaf seal has been developed, such as that shown for example in FIG. 17. As shown in FIG. 17, the leaf seal 10 comprises flat thin plates 18 having a predetermined width, provided in multiple layers in the axial direction of the rotary shaft 11 at the rim thereof.

The outer base ends of the thin plates 18 are brazed inside a casing 12, that is, the thin plate 18 is attached to the casing by brazing section 15, the sealing the outer rim of the rotary shaft 11 and thereby dividing the peripheral space of the rotary shaft 11 into a high pressure region and a low pressure region. A high pressure side side-plate 14 and a low pressure side side-plate 13 are attached respectively in the high pressure region and the low pressure region at both sides of the thin plates 18, and function as guides in the direction of pressure.

The thin plates 18 have predetermined rigidity, which is determined by the thickness of the plates, in the axial direction of the rotary shaft 11. The thin plates 18 are attached to the casing 12 so that the angle they form with the rim of the rotary shaft 11 is acute with respect to the axial direction of the rotary shaft 11. Although the tips of the thin plates 18 contact the rotary shaft 11 with a predetermined pressure when the rotary shaft 11 is stationary, the dynamic pressure created by the rotation of the rotary shaft 11 causes the tips of the thin plates 18 to rise upward when the rotary shaft 11 is rotating, so that there is no contact between the thin plates 18 and the rotary shaft 11.

A slight gap 19 is provided between each of the laminated flat thin plates 18. Since the seal diameter is sufficiently large, i.e. since the diameter of the rotary shaft 11 is sufficiently large, each gap 19 can be regarded as approximately constant from the outer side of the rim to the inner side of the rim.

In the shaft seal having the constitution described above, the thin plates 18 having a width in the axial direction of the rotary shaft 11 are laminated in the peripheral direction of the rotary shaft 11. The thin plates 18 have gentle flexibility in the peripheral direction of the rotary shaft 11, and the seal mechanism has high rigidity in the axial direction of the rotary shaft 11.

In the above seal mechanism, since the thin plates 18 which are the seal member are provided in parallel in the axial direction of the rotary shaft 11, the outer side brazing which is affixed to the casing 12 is secure in the axial direction of the rotary shaft 11. Consequently, it is possible to prevent the thin plates 18 from becoming removed from the casing 12; this is a drawback of conventional brush seals, in which the wires may become removed from the casing.

However, the brush seal described above has the following problems.

There is a problem of leakage from between the wires 6, and from the sliding face on the outer rim of the rotary shaft 1 which touches the wires 6, but when the seal differential pressure exceeds a tolerance level which is determined by the diameter of the wires 6 and the arrangement of the low pressure side side-plates 3, and the like, all the wires 6 will become distorted toward the low pressure side and break, creating a blow-through space between the wires 6 and the rotary shaft 1 with the consequence loss of the seal function.

The rigidity of the wires 6 which comprise the brush seal is determined by their ability to follow the axial vibration of the rotary shaft 1, the appropriate pressure against the rotary shaft 1, and the like, and there is a limit on the extent to which flexibility can be increased by increasing the diameter of the wires 6 and the like. Therefore, the seal differential pressure in the axial direction of the rotary shaft 1, which is dependent on the flexibility of the wires 6, has a maximum of approximately 0.5 MPa, and no differential pressure larger than this can be sealed. Since the wires 6 are extremely thin, in general, they have a diameter of approximately 50 to 100 μm, there is a danger that the wires 6 will break and fall out as a result of sliding against the rim of the rotary shaft 1; this makes it difficult to use the gas turbine for a long period of time.

Since the wires 6 slide against the peripheral face of the rotary shaft 1, the amount of gas which leaks from the tips of the wires 6 is markedly less than in the labyrinth seal and the like. However, it is difficult to stabilize the leakage between the tips of the wires 6 at a low amount.

Since the wires 6 and the peripheral face of the rotary shaft 1 slide against each other, a corrosion-resistant must be provided on the surface of the rotary shaft 1. However, there is no established method of applying a corrosion-resistant coating, which is resistant over a prolonged period of use, to the peripheral face of a large-diameter rotary shaft. Since the wires 6 and the rotary shaft 1 are considerably corroded, the life of the brush seal is short and it must be frequently replaced.

Furthermore, the leaf seal 10 described above has the following problems.

The dynamic pressure generated by the rotation of the rotary shaft 11 causes the tips of the thin plates 18 to rise upward from the surface of the rotary shaft 11, so that there is no contact between the thin plates 18 and the rotary shaft 11. This constitution prevents excessive heat generation and corrosion. However, in the case where the low pressure side side-plate 13 and the high pressure side side-plate 14 are provided in such a manner that the gap between the low pressure side side-plate 13 and the thin plates 18 is substantially equal to the gap between the high pressure side side-plate 14 and the thin plates 18, when pressure has been applied from the high pressure side, the additional pressure load deforms the thin plates 18 toward the center of the radial direction of the rotary shaft 11, making it difficult to stop the thin plates from touching the rotary shaft 11 when the leaf seal is activated with small dynamic pressure and the like.

For these reasons, the brush seal and leaf seal described above require further improvements to reduce gas leakage and increase corrosion-resistance.

SUMMARY OF THE INVENTION

The present invention has been realized in consideration of the matters mentioned above, and aims to provide a shaft seal which reduces the leakage of gas from the high pressure side to the low pressure side, and has excellent corrosion-resistance, and a gas turbine which is equipped with the shaft seal.

In order to achieve the above objects, the present invention provide a shaft seal comprising: a plurality of flexible thin plates having width in the axial direction of a rotary shaft, tips thereof sliding against a peripheral face of the rotary shaft, and outer peripheral bases thereof being secured to a casing side maintaining a gap therebetween, the thin plates being laminated in the peripheral direction of the rotary shaft, enabling the outer periphery of the rotary shaft to be sealed, an acute angle being formed between the thin plates and the peripheral face of the rotary shaft; and a low pressure side side-plate and a high pressure side side-plate which are provided on both sides of the thin plates in the axial direction of the rotary shaft, wherein it further comprises a gas pressure adjusting mechanism, which when the thin plates are viewed cross-sectionally along an imaginary plane which is perpendicular to the direction of their width, the face of each thin plate which faces the rotary shaft is deemed a bottom face and the rear side is deemed a top face, and gas pressure from the high pressure side side-plate to the low pressure side side-plate is applied to the thin plates, ensures that the gas pressure applied to the bottom faces is higher than the gas pressure applied to the top faces at a given point along the cross-sectional face of the thin plates.

In the shaft seal, it is preferable that the gas pressure adjusting mechanism makes a gas pressure distribution such that the gas pressure is highest at the angular section, which is positioned at the tip side and on the side of the high pressure side side-plate, and gradually weakens as it approaches a diagonally opposing angle.

According to the shaft seal, the gas pressure adjusting mechanism can adjust the gas pressure so that, when the thin plates are viewed in cross-section along an imaginary plane at a right-angle to the direction of their width, and the face of the thin plate which faces the rotary shaft is deemed the bottom face and the rear side is deemed the top face, and gas pressure from the high pressure side side-plate to the low pressure side side-plate is applied to the thin plates, the gas pressure applied to the bottom face is higher than the gas pressure applied to the top face at a given point along the cross-sectional faces of the thin plates. Therefore, the thin plates rise up and do not contact the rotary shaft.

More specifically, gas flowing from the high pressure side to the low pressure side flows between the peripheral face of the rotary shaft and the tips of the thin plates, and along the top and bottom faces of the thin plates. At this time, the gas flowing along the top and bottom faces of the thin plates enters between the high pressure side side-plate and the peripheral face of the rotary shaft, and spreads toward the diagonally opposite angle. Simultaneously, the gas pressure which strikes the top and bottom faces of the thin plates at a perpendicular gas a triangular distribution, increasing as it nears the tip sections and decreasing as it heads toward the outer peripheral base. Although the gas pressure distribution on the top and bottom faces is substantially the same, the thin plates are arranged diagonally so as to form an acute angle with the peripheral face of the rotary shaft, and consequently, the positions of the pressure distribution on the top and bottom faces deviate from each other. That is, when the gas pressures on the top and bottom faces are compared at any given point from the outer peripheral base to the tip side of the thin plate, they are found to be different.

Since the gas pressure against the bottom face (Fb) is higher than the gas pressure against the top face (Fa), the thin plates deform and rise up higher than the rotary shaft, acting in this direction. At this time, the reverse occurs at the section near the tips of the thin plates, gas pressure being applied only to the top face (since the outermost tip sections of the thin plates are cut diagonally so that they touch the peripheral face, there is no section corresponding to the bottom face). This force is cancelled out by the pressure of gas flowing between the peripheral face and the tips of the thin plates, which acts in the direction along which the tips of the thin plates rise from the peripheral face (Fc), and consequently, there is no force pressing the tips of the thin plates against the rotary shaft. Therefore, the pressure load of the gas pressure applied to the each thin plate is (Fb+Fc) >Fa, enabling the thin plates to be deformed so as to rise up higher than the peripheral face.

The size of the section which is affixed to the casing is larger than is the case when using wires of a conventional brush seal, enabling the thin plates to be securely affixed to the casing.

Since the tips of the thin plates are highly rigid in the axial direction of the rotary shaft and flexible in the peripheral direction of the rotary shaft, they are unlikely to deform in the direction of differential pressure, enabling the tolerance of the seal differential pressure to be increased and reducing the contact between the thin plates and the rotary shaft when the rotary shaft is vibrating.

In the shaft seal, it is preferable for the gas pressure adjusting mechanism to comprise the low pressure side side-plate and the high pressure side side-plate, which are positioned so that the size of a low pressure side gap between the thin plates and the low pressure side side-plate is larger than a high pressure side gap between the thin plates and the high pressure side side-plate.

According to the shaft seal, when pressure is applied from the high pressure side, the gas passes through the thin plates and attempts to flow from the high pressure side to the low pressure side. However, at this time, since the gap between the thin plates and the low pressure side side-plate is larger than the gap between the thin plates and the high pressure side side-plate, the gas which has entered from between the high pressure side side-plate and the peripheral face of the rotary shaft flows along the top and bottom faces of the thin plates and spreads to the diagonally opposite angle, and simultaneously, a low pressure region expands at the outer peripheral base. Therefore, the distribution of gas pressure against the top and bottom faces can be made triangular at a given point along the cross-sectional face of the thin plates which is perpendicular to the axial direction, gradually decreasing as it approaches the outer peripheral base from the tip side of the thin plates. For the reasons mentioned above, pressure difference is created on the top and bottom faces of the thin plates, causing them to rise up to a state of non-contact with the rotary shaft.

In addition, it is preferable for the gas pressure adjusting mechanism to comprise the high pressure side side-plate, and the low pressure side side-plate of which the length in the radial direction of the rotary shaft is shorter than the length of the high pressure side side-plate in the radial direction of the rotary shaft.

According to the shaft seal, when pressure is applied from the high pressure side, the gas passes the thin plates and attempts to flow from the high pressure side to the low pressure side. However, at this time, since the length of the low pressure side side-plate in the rotary shaft radial direction is shorter than the length of the high pressure side side-plate in the rotary shaft radial direction, thereby creating a space on the low pressure side, the gas which has entered from between the high pressure side side-plate and the peripheral face of the rotary shaft flows along the top and bottom faces of the thin plates and spreads to the diagonally opposite angle, and simultaneously, a low pressure region expands at the outer peripheral base. Therefore, the distribution of gas pressure against the top and bottom faces can be made triangular at a given point along the cross-sectional face of the thin plates which is perpendicular to the axial direction, gradually decreasing as it approaches the outer peripheral base from the tip side of the thin plates. For the reasons mentioned above, pressure difference is created on the top and bottom faces of the thin plates, causing them to rise up to a state of non-contact with the rotary shaft.

In addition, it is preferable for the gas pressure adjusting mechanism to comprise a flexible plate, which is flexible in the axial direction of the rotary shaft and is arranged on the high pressure side of the thin plates.

According to the shaft seal, when pressure is applied from the high pressure side, the gas passes the thin plates and attempts to flow from the high pressure side to the low pressure side. However, when the flexible plates, which are flexible in the axial direction of the rotary shaft, are provided on the high pressure side of the thin plates (e.g. by making the high pressure side side-plate a low-relief plate which is flexible in the axial direction of the rotary shaft, or by providing a low-relief plate, which is flexible in the axial direction of the rotary shaft, in the gap between the high pressure side side-plate and the thin plate, and the like), the flexible plate bends as a result of the gas pressure from the high pressure side, reducing the size of the gap between the thin plate and the high pressure side until it is narrower than the gap between the thin plate and the low pressure side. Consequently, the gas which has entered from between the high pressure side side-plate and the peripheral face of the rotary shaft flows along the top and bottom faces of the thin plates and spreads to the diagonally opposite angle, and simultaneously, the low pressure region expands at the outer peripheral base. Therefore, the distribution of gas pressure against the top and bottom faces can be made triangular at a given point along the cross-sectional face of the thin plates which is perpendicular to the axial direction, gradually decreasing as it approaches the outer peripheral base from the tip side of the thin plates. For the reasons mentioned above, pressure difference is created on the top and bottom faces of the thin plates, causing them to rise up to a state of non-contact with the rotary shaft.

In addition, it is preferable for the gas pressure adjusting mechanism to comprise slitted flexible plates, which are flexible in the axial direction of the rotary shaft, are arranged on the high pressure side of the thin plates, and comprise slits at more than two places along the entire rim thereof.

According to the shaft seal, when pressure is applied from the high pressure side, the gas passes the thin plates and attempts to flow from the high pressure side to the low pressure side. However, when the slitted flexible plates, which are flexible in the axial direction of the rotary shaft and have slits at more than two places along their entire rim, are provided on the high pressure side of the thin plates (e.g. by making the high pressure side side-plate a thin plate which is flexible in the axial direction of the rotary shaft and has slits at more than two places along its entire rim, or by providing a low-relief plate, which is flexible in the axial direction of the rotary shaft and has slits at more than two places along its entire rim, in the gap between the high pressure side side-plate and the thin plate, and the like), the flexible plate bends as a result of the gas pressure from the high pressure side, reducing the size of the gap between the thin plate and the high pressure side until it is narrower than the gap between the thin plate and the low pressure side. Consequently, the gas which has entered from between the high pressure side side-plate and the peripheral face of the rotary shaft flows along the top and bottom faces of the thin plates and spreads to the diagonally opposite angle, and simultaneously, the low pressure region expands at the outer peripheral base. Therefore, the distribution of gas pressure against the top and bottom faces can be made triangular at a given point along the cross-sectional face of the thin plates which is perpendicular to the axial direction, gradually decreasing as it approaches the outer peripheral base from the tip side of the thin plates. For the reasons mentioned above, pressure difference is created on the top and bottom faces of the thin plates, causing them to rise up to a state of non-contact with the rotary shaft.

In addition, it is preferable for the gas pressure adjusting mechanism to comprise a low pressure side side-plate in which a plurality of draft holes passing through the low pressure side side-plate in the axial direction of the rotary shaft.

According to the shaft seal, when pressure is applied from the high pressure side, the gas passes the thin plates and attempts to flow from the high pressure side to the low pressure side. However, when the plurality of draft holes are provided through the low pressure side side-plate in the axial direction of the rotary shaft (e.g. by providing a plurality of draft holes passing through the low pressure side side-plate toward the axial direction of the rotary shaft, or by using a porous material as the low pressure side side-plate, and the like), the gas which has entered from between the high pressure side side-plate and the peripheral face of the rotary shaft flows along the top and bottom faces of the thin plates and spreads to the diagonally opposite angle, and simultaneously, the low pressure region expands at the outer peripheral base. Therefore, the distribution of gas pressure against the top and bottom faces can be made triangular at a given point along the cross-sectional face of the thin plates which is perpendicular to the axial direction, gradually decreasing as it approaches the outer peripheral base from the tip side of the thin plates. For the reasons mentioned above, a pressure difference is created between the top and bottom faces of the thin plates, causing them to rise up to a state of non-contact with the rotary shaft.

In addition, it is preferable for the shaft seal to further comprises a gap size adjusting mechanism, which is provided between the low pressure side side-plate and the thin plates, for supporting the thin plates and maintaining the size of the gap between the low pressure side side-plate and the thin plates when the thin plates attempt to move toward the low pressure side side-plate.

It is preferable for the gap size adjusting mechanism to comprise a first step section, which is provided on the side of the low pressure side side-plate so as to protrude toward the thin plates side; and the first step section forms a ring which runs along the low pressure side side-plate around the rotary shaft.

In addition, it is preferable for the first step section to comprise ventilation holes for forming a space which joins the rotary shaft radial direction inner peripheral side and the rotary shaft radial direction outer peripheral side between the thin plate and the low pressure side side-plate.

According to the shaft seal, since the ventilation holes are provided in the first step section comprising the gap size adjusting mechanism, resistance to the flow of gas between the rotary shaft radial direction inner peripheral side and the rotary shaft radial direction outer peripheral side, is reduced in the gap space between the thin plate and the low pressure side side-plate with the step section as a boundary. Consequently, the first step section continues to support the thin plates, while achieving pressure distribution in the radial direction of the rotary shaft just as though the first step section did not exist.

Therefore, when the pressure of gas flowing from the high pressure side side-plate to the low pressure side side-plate is applied to the thin plates, the gas pressure distribution over a wide range can be made such that the gas pressure against the top and bottom faces of the thin plates is highest at an angular section at the tip side opposite to the rotary shaft and on the side of the high pressure side side-plate, and gradually weakens as it approaches the diagonally opposite angular section, avoiding gas distribution over a narrow range.

Therefore, since a wide gas pressure distribution can be applied to the thin plates, the pressure difference on the top and bottom faces of the thin plates can be reliably achieved throughout a wide area, making it possible to reliably adjust the gas pressure so that the thin plates rise up higher than the peripheral face of the rotary shaft.

It is preferable for the gap adjusting mechanism to comprise a second step section, which is provided on the side of the low pressure side side-plate so as to protrude toward the thin plates side; and the second step section comprising a plurality of ring divided plates, provided intermittently with equal intervals therebetween along the low pressure side side-plate so as to form a ring around the rotary shaft.

According to the shaft seal, since the plurality of ring divided plates are arranged with intervals therebetween in the second step section comprising the gap size adjusting mechanism, resistance to the flow of gas between the rotary shaft radial direction inner peripheral side and the rotary shaft radial direction outer peripheral side, is reduced in the gap space between the thin plate and the low pressure side side-plate with the second step section as a boundary. Consequently, the second step section continues to support the thin plates, while achieving pressure distribution in the radial direction of the rotary shaft just as though the second step section did not exist.

Therefore, when the pressure of gas flowing from the high pressure side side-plate to the low pressure side side-plate is applied to the thin plates, the gas pressure distribution over a wide range can be made such that the gas pressure against the top and bottom faces of the thin plates is highest at an angular section at the tip side opposite to the rotary shaft and on the side of the high pressure side side-plate, and gradually weakens as it approaches the diagonally opposite angular section, avoiding gas distribution over a narrow range. Therefore, the pressure difference between the top and bottom faces of the thin plates can be reliably achieved over a wide area, making it possible to reliably adjust the gas pressure so that the thin plates rise up higher than the peripheral face of the rotary shaft.

It is preferable that a plurality of the first step section are provided concentrically around the rotary shaft. In addition, it is also preferable that a plurality of the second step section are provided concentrically around the rotary shaft. According to these shaft seals, it is possible to obtain the same effects as that of the above shaft seal.

In addition, it is preferable for the gap adjusting mechanism to comprise a third step section, which is provided on the side of the low pressure side side-plate so as to protrude toward the thin plates side; and the third step section comprising a plurality of spiral plates, which, when the low pressure side side-plate is viewed from the thin plates side, are provided spirally from the rotary shaft radial direction inner peripheral side to the rotary shaft radial direction outer peripheral side of the low pressure side side-plate with equal intervals therebetween.

According to the shaft seal, since the plurality of spiral plates are arranged with intervals therebetween in the third step section comprising the gap size adjusting mechanism, resistance to the flow of gas between the rotary shaft radial direction inner peripheral side and the rotary shaft radial direction outer peripheral side, is reduced in the gap space between the thin plate and the low pressure side side-plate with the third step section as a boundary. Consequently, the third step section continues to support the thin plates, while achieving pressure distribution in the radial direction of the rotary shaft just as though the third step section did not exist.

Therefore, when the pressure of gas flowing from the high pressure side side-plate to the low pressure side side-plate is applied to the thin plates, the gas pressure distribution over a wide range can be made such that the gas pressure against the top and bottom faces of the thin plates is highest at an angular section at the tip side opposite to the rotary shaft and on the side of the high pressure side side-plate, and gradually weakens as it approaches the diagonally opposite angular section, avoiding gas distribution over a narrow range.

Therefore, the pressure difference between the top and bottom faces of the thin plates can be reliably achieved over a wide area, making it possible to reliably adjust the gas pressure so that the thin plates rise up higher than the peripheral face of the rotary shaft.

In addition, it is preferable for the first step section to be provided along the radial direction of the low pressure side side-plate to the position of the casing.

In addition, it is preferable for the first step section to comprise pressure-leading holes passing through the high pressure side side-plate in the axial direction of the rotary shaft.

Furthermore, it is preferable for the gap adjusting mechanism to comprise a fourth step section, which is provided with the side of the thin plates so as to protrude toward the low pressure side side-plate.

According to the shaft seal, since a protruding section is provided in the side of the thin plates to form the fourth step section comprising the gap size adjusting mechanism, resistance to the flow of gas between the rotary shaft radial direction inner peripheral side and the rotary shaft radial direction outer peripheral side, is reduced in the gap space between the thin plate and the low pressure side side-plate with the fourth step section as a boundary. Consequently, the fourth step section continues to support the thin plates, while achieving pressure distribution in the radial direction of the rotary shaft just as though the fourth step section did not exist.

Therefore, when the pressure of gas flowing from the high pressure side side-plate to the low pressure side side-plate is applied to the thin plates, the gas pressure distribution over a wide range can be made such that the gas pressure against the top and bottom faces of the thin plates is highest at an angular section at the tip side opposite to the rotary shaft and on the side of the high pressure side side-plate, and gradually weakens as it approaches the diagonally opposite angular section, avoiding gas distribution over a narrow range. Therefore, the pressure difference between the top and bottom faces of the thin plates can be reliably achieved over a wide area, making it possible to reliably adjust the gas pressure so that the thin plates rise up higher than the peripheral face of the rotary shaft.

Furthermore, according to these shaft seals, since the gap size adjusting mechanism is provided, when the a thin plate attempts to move near the side of the low pressure side side-plate, supports the thin plate and stops it from moving nearer. Therefore, even when assembly errors are made at the time of assembling the shaft seal, and when the thin plates suffer deformation and the like due to the pressure of gas flowing from the high pressure side to the low pressure side during operation, the gap between the thin plates and the low pressure side side-plate can be maintained at the predetermined size.

Consequently, it becomes possible to reliably make the gap between the thin plates and the low pressure side side-plate larger than the gap between the thin plates and the high pressure side side-plate. Since the effects of the third, fifth, and sixth aspects can also be obtained reliably, a pressure difference is created between the top and bottom faces of the thin plates, causing them to rise to a state of non-contact with the rotary shaft even when there is only a small dynamic pressure at start-up.

In order to achieve the above objects, the present invention provide another shaft seal comprising: a plurality of flexible thin plates having width in the axial direction of a rotary shaft, tips thereof sliding against a peripheral face of the rotary shaft and outer peripheral bases thereof being secured to a casing side, and gaps provided therebetween, the thin plates being laminated in the peripheral direction of the rotary shaft, enabling the outer periphery of the rotary shaft to be sealed, an acute angle being formed between the thin plates and the peripheral face of the rotary shaft; wherein a gas ventilation space for allowing gas to pass from the high pressure side to the low pressure side, provided in the low pressure side of the thin plates in the axial direction.

According to the shaft seal, when pressure is applied from the high pressure side, the gas passes the thin plates and attempts to flow from the high pressure side to the low pressure side. However, by providing a gas ventilation space for allowing gas to pass from the high pressure side to the low pressure side, the gas which has entered from between the high pressure side side-plate and the peripheral face of the rotary shaft flows along the top and bottom faces of the thin plates and spreads to the diagonally opposite angle, and simultaneously, the low pressure region expands at the outer peripheral base. Therefore, the distribution of gas pressure against the top and bottom faces can be made triangular at a given point along the cross-sectional face of the thin plates which is perpendicular to the axial direction, gradually decreasing as it approaches the outer peripheral base from the tip side of the thin plates. For the reasons mentioned above, a pressure difference is created between the top and bottom faces of the thin plates, causing them to rise up to a state of non-contact with the rotary shaft.

In addition, in order to achieve the above objects, the present invention provide a gas turbine which leads gas of high temperature and high pressure into a casing and blows it against moving blades, which are rotatably supported inside the casing, thereby converting the thermal energy of the gas to mechanical rotation energy and generating dynamic force, wherein the gas turbine comprising the shaft seal.

According to the gas turbine, the gas turbine has the effects in that there is no need to replace the shaft seal for a long period of time.

BRIEF DESCRIPTION OF THE DRAWINGS

FIG. 3A is a cross-sectional view from the cross-sectional face which passes the axial line of the rotary shaft and FIG. 3B is a cross-sectional view taken along the line B—B of FIG. 3A.

FIG. 6A is a perspective view, and FIG. 6B being a perspective view of a modification of a leaf seal shown in FIG. 6A.

DESCRIPTION OF THE PREFERRED EMBODIMENTS

Below, preferred embodiments of a shaft seal and a gas turbine which is equipped with the shaft seal according to the present invention will be explained referring figures. However, the present invention is, of course, not limited to the following embodiments.

(First Embodiment)

A first embodiment of the present invention will be explained with reference to FIGS. 1 to 3.

Figure 1:
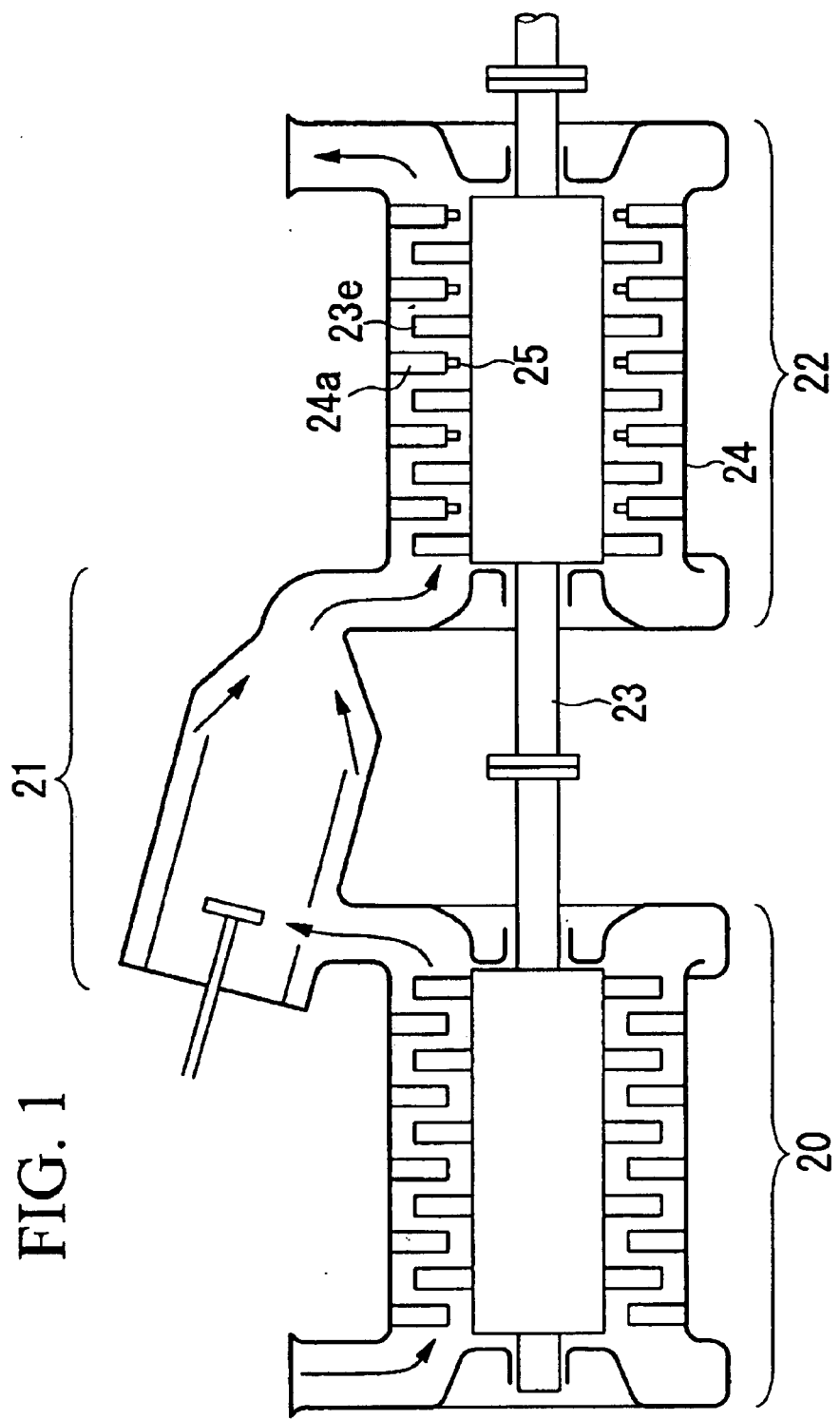
FIG. 1 is a schematic cross-sectional view showing a first embodiment of a gas turbine which is equipped with the shaft seal according to the present invention.

FIG. 1 shows the schematic constitution of a gas turbine. In FIG. 1, reference numeral 20 represents a compressor, reference numeral 21 represents a combustor, and reference numeral 22 represents a turbine. The compressor 20 compresses a large amount of air, which is fed therein. In general, in a gas turbine, some of the dynamic force obtained from a rotary shaft 23 which is explained below is used as dynamic force for the compressor 20. The combustor 21 mixes fuel with the air which has been compressed by the compressor 20, and burns it. The combustible gas generated by the combustor 21 is fed into the turbine 22, which expands it and blows it against moving blades 23e, which are provided on the rotary shaft 23, converting the thermal energy of the combustible gas to mechanical rotation energy and thereby generating dynamic force.

In addition to a plurality of moving blades 23e of the sides of the rotary shaft 23, the turbine also has a plurality of stationary blades 24a provided on the sides of the casing 24. The moving blades 23e and the stationary blades 24a are arranged alternately along the axial direction of the rotary shaft 23. The combustible gas flows along the axial direction of the rotary shaft 23 and applies pressure to the moving blades 23e, which consequently rotate the rotary shaft 23; the rotational energy applied to the rotary shaft 23 is extracted from the end of the axis. A leaf seal 25 is provided between the stationary blades 24a and the rotary shaft 23, and functions as a shaft seal for reducing the amount of combustible gas which leaks from the high pressure side to the low pressure side.

Figure 2:
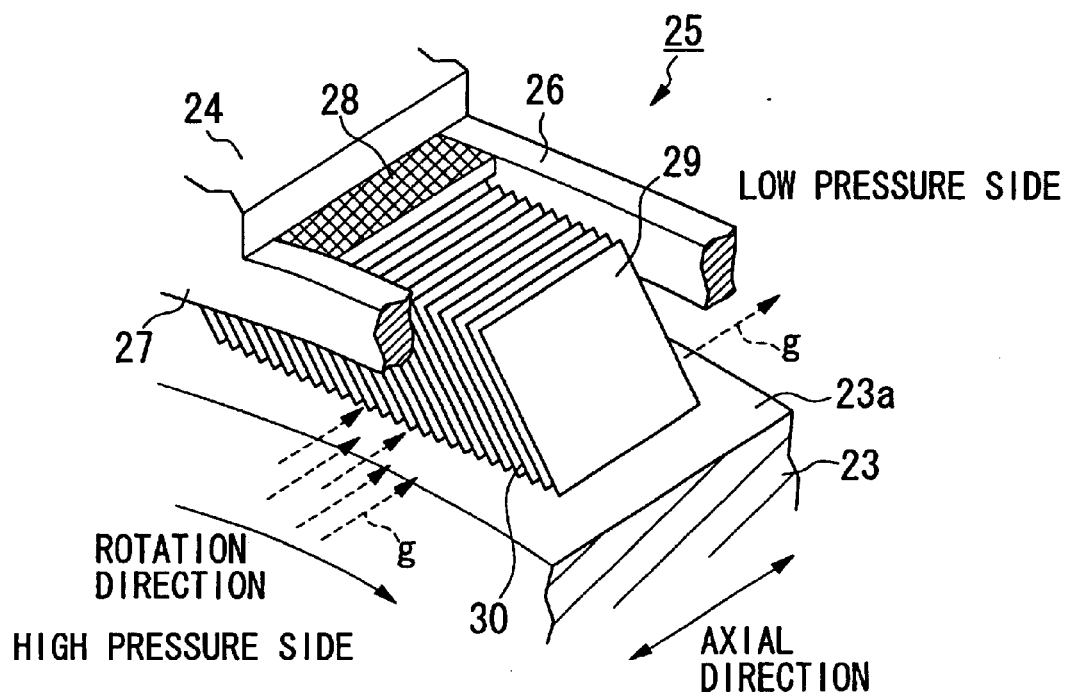
FIG. 2 is a perspective view of a leaf seal, i.e., a shaft seal of the first embodiment.

FIG. 2 shows a perspective view of the leaf seal 25. As shown in FIG. 2, the leaf seal 25 comprises a plurality of flexible thin plates 29 having a flexibility and a width in the axial direction of the rotary shaft 23 and sliding against the peripheral face 23a of the rotary shaft 23. The thin plates 29 have gaps 30 therebetween, and are secured by a brazing section 28 to the side of the casing 24. A plurality of the thin plates 29 are provided in the peripheral direction of the rotary shaft 23 so as to be laminated and capable of sealing the outer rim thereof. The thin plates 29 and the peripheral face peripheral face 23a of the rotary shaft 23 form an acute angle. In addition, a low pressure side side-plate 26 and a high pressure side side-plate 27 are provided on either side of the axial direction of the thin plates 29.

Each thin plate 29 is the shape of a flat sheet having a predetermined width in the axial direction of the rotary shaft 23. The thin plates 29 are provided in a laminated arrangement in the peripheral direction of the rotary shaft 23. The outer peripheral side base is brazed at the brazing section 28 inside the casing 24, sealing the outer peripheral of the rotary shaft 23 so as to divided the surrounding space of the rotary shaft 23 into a high pressure side and a low pressure side. On either side of the width direction of the thin plates 29, the high pressure side side-plate 27 is provided in the high pressure side, and the low pressure side side-plate 26 is provided in the low pressure side. The high pressure side side-plate 27 and the high pressure side side-plate 27 function as guide plates in the direction of pressure.

Figure 3A:
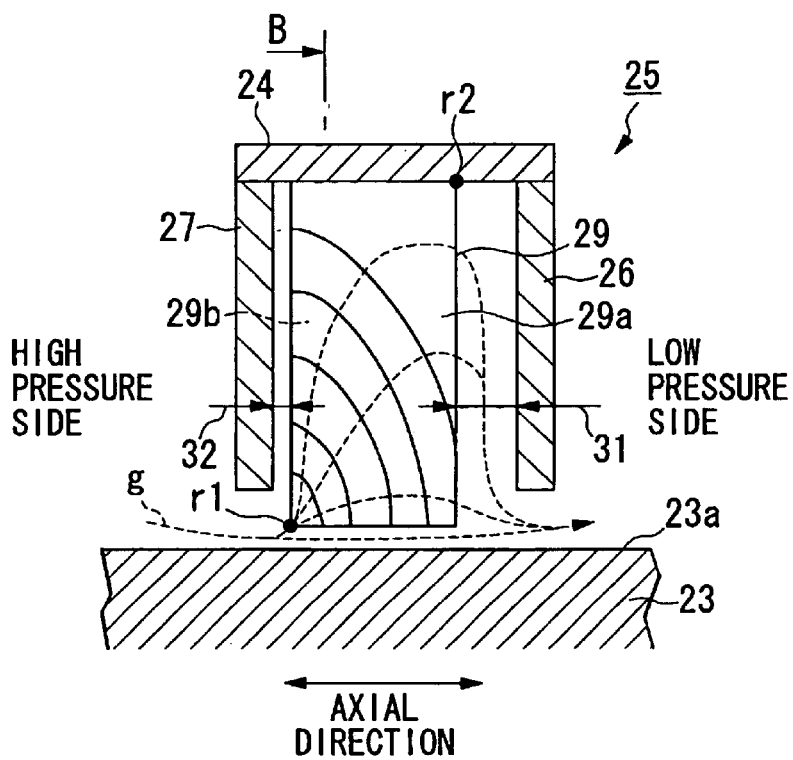
FIGS. 3A and 3B are diagrams showing a leaf seal of the first embodiment.

As shown in FIG. 3A, the leaf seal 25 comprises a gas pressure adjusting mechanism which forms a gas pressure distribution 30a in which when gas pressure from the high pressure side toward the low pressure side, i.e., from the high pressure side side-plate 27 to the low pressure side side-plate 26 is applied to each thin plate 29, the gas pressure is highest at an angular section r1, which is at the tip side and on the side of the high pressure side side-plate 27, and gradually weakens as it approaches a diagonally opposite angular section r2.

Figure 3B:
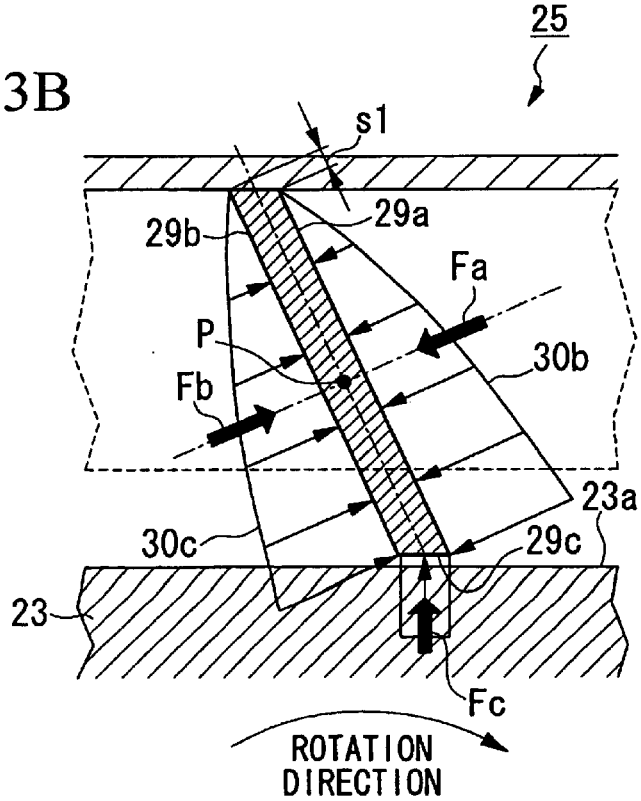

In other words, the gas pressure adjusting mechanism can adjust the gas pressure so that when the thin plates 29 are viewed in cross-section along an imaginary plane at a right-angle to the direction of the width of the thin plates 29 as shown in FIG. 3B, and the face of the thin plate which faces the rotary shaft 23 is deemed the bottom face 29b and the rear side is deemed the top face 29a, and gas pressure from the high pressure side toward the low pressure side, i.e., from the high pressure side side-plate 27 to the low pressure side side-plate 26 is applied to the thin plates 29, the gas pressure applied to the bottom face 29b is higher than the gas pressure applied to the top face 29a at a given point along the cross-sectional faces of the thin plates 29. This mechanism will be explained below in detail.

In the pressure adjusting mechanism of the first embodiment, the low pressure side gap 31 between each of the thin plates 29 and the low pressure side side-plate 26 is larger than the high pressure side gap 32 between each of the thin plates 29 and the high pressure side side-plate 27.

By adjusting the size of the gap so that the low pressure side has a larger space than the high pressure side, when pressure is applied from the high pressure side, the gas g, which passes through the thin plates 29 in flowing from the high pressure side to the low pressure side, flows widely along the top face 29a and the bottom face 29b of each of the thin plates 29 toward the diagonal angle, and simultaneously, the low pressure region at the outer peripheral base increases. Consequently, as already explained, it is possible to make the shape of the distribution of gas pressure which is applied to the top face 29a and bottom face 29b of the thin plates 29 a triangle, in which the distribution gradually decreases from the tip side of the thin plates 29 to the outer peripheral base of the thin plates 29, at a given point along the cross-sectional faces of the thin plates 29 which are perpendicular to the direction of the width.

This will be explained in greater detail. The gas g flowing from the high pressure side to the low pressure side flows between the peripheral face 23a of the rotary shaft 23 and the tips of the thin plates 29, and also flows along the top face 29a and bottom face 29b of the thin plates 29. As shown in FIG. 3A, at this time, the gas g flowing along the top face 29a and bottom face 29b of the thin plates 29 enters between the high pressure side side-plate 27 and the peripheral face 23a of the rotary shaft 23, and flows radially from r1 toward r2, whereby the low pressure region expands at the outer peripheral base. Therefore, as shown in FIG. 3B, the gas pressure distributions 30b and 30c, applied at a perpendicular to the top face 29a and bottom face 29b of the thin plates 29, increase nearer the tip section and decrease as they approach the outer peripheral base, producing triangular distribution.

The shapes of the gas pressure distributions 30b and 30c at the top face 29a and bottom face 29b are substantially identical. However, since the thin plates 29 are arranged diagonally so as to form an acute angle with the peripheral face 23a of the rotary shaft 23, the relative positions of the gas pressure distributions 30b and 30c at the top face 29a and bottom face 29b deviate by a distance of s1. A comparison of the gas pressures against the top face 29a and the bottom face 29b at a predetermined point P along the line from the outer peripheral side to the tip side of the thin plates 29 shows that there is a difference between them.

Since, as already mentioned, the gas pressure against the bottom face 29b (Fb) is higher than the gas pressure against the top face 29a (Fa), the thin plates 29 deform and rise up higher than the rotary shaft 23, acting in this direction. At this time, since the outermost tip sections of the thin plates 29 are cut diagonally so that they touch the peripheral face 23a, there is no section corresponding to the bottom face 29b. Therefore, the reverse occurs at the section near the tips of the thin plates 29, and gas pressure is applied only to the top face 29a. However, this force is cancelled out by the pressure of gas flowing between the peripheral face 23a and the tips of the thin plates 29, which acts in the direction along which the tips of the thin plates 29 rise from the peripheral face 23a (Fc). Consequently, there is no force pressing the tips of the thin plates 29 against the rotary shaft 23. Therefore, the pressure load of the gas pressure applied to the each thin plate 29 is (Fb+Fc)>Fa, enabling the thin plates 29 to be deformed so as to rise up higher than the peripheral face 23a.

Therefore, it is possible to create a pressure difference between the top face 29a and the bottom face 29b of each thin plate 29, deforming the thin plates 29 so as to rise from the peripheral face 23a and achieving a state of non-contact.

As explained above, the pressure adjusting mechanism uses the difference in pressure when gas pressure is applied from the high pressure side to achieve a state of non-contact between the thin plates 29 and the rotary shaft 23. However, as explained below, a similar state of non-contact between the thin plates 29 and the rotary shaft 23 can be achieved by using the rotation of the rotary shaft 23.

The thin plates 29 are designed so as to have a predetermined flexibility, determined on their thickness, in the axial direction of the rotary shaft 23. In addition, as described above, the thin plates 29 are installed inside the casing 24 with an acute angle between the peripheral face 23a of the rotary shaft 23 and the axial direction of the rotary shaft 23. When the rotary shaft 23 stops, the tips of the thin plates 29 contact the rotary shaft 23 with a predetermined pressure, but when the rotary shaft 23 is rotating, the dynamic pressure of the rotation of the rotary shaft 23 causes the tips of the thin plates 29 to rise up, achieving a state of non-contact between the thin plates 29 and the rotary shaft 23.

Incidentally, slight gaps 30 are provided between the laminated flat thin plates 29 (see FIG. 2). Since the seal diameter is sufficiently large, i.e., since the diameter of the rotary shaft 23 is sufficiently large, each gap 30 can be regarded as approximately constant from the outer side of the rim to the inner side of the rim.

In the leaf seal 25, that is, the shaft seal of the embodiment described above and a gas turbine comprising the leaf seal 25, the angle between the thin plates 29 and the peripheral face 23a of the rotary shaft 23 is made acute, and the pressure adjusting mechanism for applying a rising force to the thin plates 29 is provided, in which the low pressure side gap 31 between each of the thin plates 29 and the low pressure side side-plate 26 is larger than the high pressure side gap 32 between each of the thin plates 29 and the high pressure side side-plate 27. Consequently, a difference in pressure load ((Fb+Fc)>Fa) can be achieved between the top face 29a and the bottom face 29b of the thin plates 29 even at start-up when there is only a small dynamic force, and it becomes possible to prevent contact between the thin plates 29 and the rotary shaft 23 by making the tips of the thin plates 29 rise up higher than the peripheral face 23a. Therefore, excessive generation of heat and corrosion, which are caused by contact between the thin plates 29 and the rotary shaft 23, can be prevented. Moreover, by preventing heat generation caused by contact between the thin plates 29 and the rotary shaft 23, it is possible to prevent vibration caused by the thermal balance of the rotary shaft 23.

When the rotary shaft 23 vibrates considerably at the time of passing the resonant point and the like, the deformation of the thin plates 29, which are installed at an acute angle, eases their contact with the rotary shaft 23. In addition, the dynamic pressure caused by the rotation of the rotary shaft 23 raises the tips of the thin plates 29 higher than the peripheral face 23a of the rotary shaft 23, avoiding contact with the rotary shaft 23.

Furthermore, by using the thin plates 29 as seal members, the section which is fixed to the casing 24 is much larger than when using conventional wires. Therefore, the thin plates 29 are securely fixed to the casing 24. Consequently, it is possible to prevent the thin plates 29 from becoming disconnected from the casing 24; this was a problem in a conventional brush seal, in which the wires became disconnected.

Since the tips of the thin plates 29 are highly rigid in the axial direction of the rotary shaft 23 and flexible in the peripheral direction of the rotary shaft, deformation is unlikely to occur in the direction of differential pressure, enabling the tolerance of seal differential pressure to be increased.

Furthermore, by making the gaps 30 between the thin plates 29 equal on the outer peripheral side and the inner peripheral side, the thin plates 29 can be arranged more tightly, and the gap between the tips of the thin plates 29 and the rotary shaft 23 can be made markedly smaller than in the case of a non-contacting labyrinth seal and the like. As a result, the amount of leakage can be reduced to approximately one-tenth of that in the labyrinth seal, whereby the performance of the gas turbine can be increased by approximately 10%.

Therefore, according to the leaf seal 25 and the gas turbine equipped with the leaf seal 25 described above, it is possible to reduce the amount of gas leaked from the high pressure side to the low pressure side and to increase the resistance to corrosion.

In the pressure adjusting mechanism of the first embodiment, the low pressure side side-plate 26 and the high pressure side side-plate 27 are arranged so that the low pressure side gap 31 is larger than the high pressure side gap 32, and whereby creating a difference in the pressure load against the thin plates 29 when pressure is applied thereto from the high pressure side, and causing the tips of the thin plates 29 to rise up. In addition, the following embodiments can, for example, be applied as modifications.

(Second Embodiment)

A second embodiment of the present invention will be explained with reference to FIG. 4. The explanation will center on the characteristic parts, and parts which are identical to those in the first embodiment will not be explained further.

Figure 4:
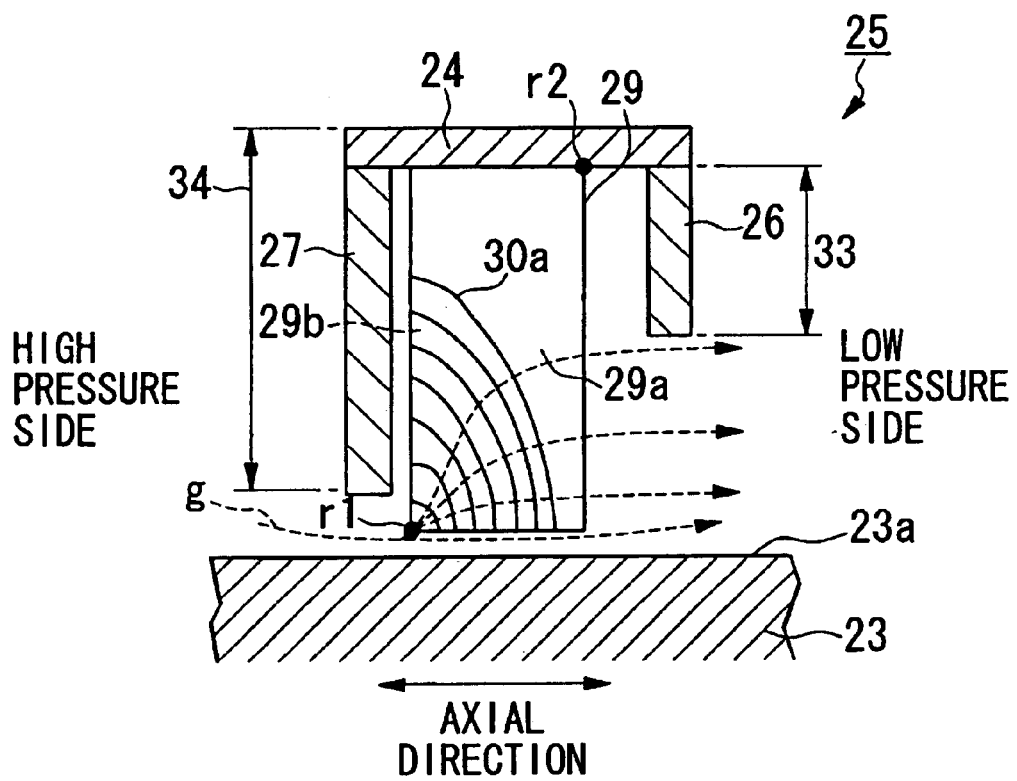
FIG. 4 shows a second embodiment of a leaf seal according to the present invention, being a cross-sectional view from the cross-sectional face which passes the axial line of the rotary shaft.

FIG. 4 shows the leaf seal 25 which is equipped with another pressure adjusting mechanism for creating a difference in pressure load between the top face 29a and the bottom face 29b of the thin plates 29 when pressure has been applied from the high pressure side, causing the tips of the thin plates 29 to rise.

In the pressure adjusting mechanism of this embodiment, the sizes of the side-plates 26 and 27 are adjusted so that the low pressure side side-plate length 33, which is the length of the low pressure side side-plate 26 in the radial direction of the rotary shaft 23, is shorter than the high pressure side side-plate length 34, which is the length of the high pressure side side-plate 27 in the radial direction of the rotary shaft 23. By adjusting the sizes of the side-plates in this way and providing a comparatively wide space on the low pressure side side-plate 26 side, when pressure has been applied from the high pressure side, the gas g passes through the thin plates 29 and flows from the high pressure side to the low pressure side. The gas g flows radially along the top face 29a and bottom face 29b of the thin plates 29 in the direction from r1 to r2. Therefore, as already mentioned, at a given position along the cross-sectional face perpendicular to the width of the thin plates 29, the distribution of gas pressure applied to the top face 29a and bottom face 29b of the thin plates 29 is made triangular, decreasing gradually from the tip side of the thin plates 29 toward the outer peripheral side base.

Therefore, for the same reason as in the first embodiment, a difference in pressure distribution is obtained between the top face 29a and bottom face 29b of the thin plates 29, and the thin plates 29 are deformed so as to rise up higher than the peripheral face 23a of the rotary shaft 23, achieving a non-contacting state with the rotary shaft 23.

As in the first embodiment, the gas pressure distribution 30a of gas pressure applied at a perpendicular to the top face 29a and bottom face 29b of the thin plates 29 by the gas g, which passes through the gap 30, is such that the gas pressure is highest at the angular section r1, which is at the tip side and on the side of the high pressure side side-plate 27, and gradually weakens as it approaches the diagonally opposite angular section r2.

At this time, the pressure distribution in the radial direction of the given cross-sectional face of the axial direction width of the thin plates 29 becomes gas pressure distributions 30b and 30c, as described in the first embodiment of FIG. 3B, and, since a difference in pressure load (($F_b+F_c$)>$F_a$) is created between the thin plate bottom face 29b and the thin plate tip face 29c, the difference in pressure load acts as a force on the thin plates 29, making their tips rise upwards.

Therefore, the difference in pressure load on the thin plates 29 acts as a force in the direction which the tips of the thin plates 29 rise. Rather than controlling the size of the low pressure side gap 31 and the high pressure side gap 32 as in the first embodiment, it is more preferable to control the low pressure side side-plate length 33 and high pressure side side-plate length 34 as in this embodiment, since this requires less dimensional precision, allows easier assembly, and reduces the cost.

In the gas pressure adjusting mechanism of this embodiment, the sizes of the side-plates 26 and 27 are adjusted so that the low pressure side side-plate length 33, which is the length of the low pressure side side-plate 26 in the radial direction of the rotary shaft 23 is shorter than the high pressure side side-plate length 34, which is the length of the high pressure side side-plate 27 in the radial direction of the rotary shaft 23. However, there are no restrictions on this, and similar effects can be obtained by providing a gas passage space, which allows the passage of the gas g which flows from the high pressure side to the low pressure side, in the side of the thin plates 29 on the axial direction low pressure side of the rotary shaft 23. For example, the low pressure side side-plate 26 may be omitted.

(Third Embodiment)

A third embodiment of the present invention will be explained with reference to FIGS. 5A and 5B. The explanation will center on the characteristic parts, and parts which are identical to those in the first embodiment will not be explained further. In the gas pressure adjusting mechanism of this embodiment, flexible plates are provided, which are flexible in the axial direction of the rotary shaft 23 and are arranged on the high pressure side of the thin plates 29.

Figure 5A:
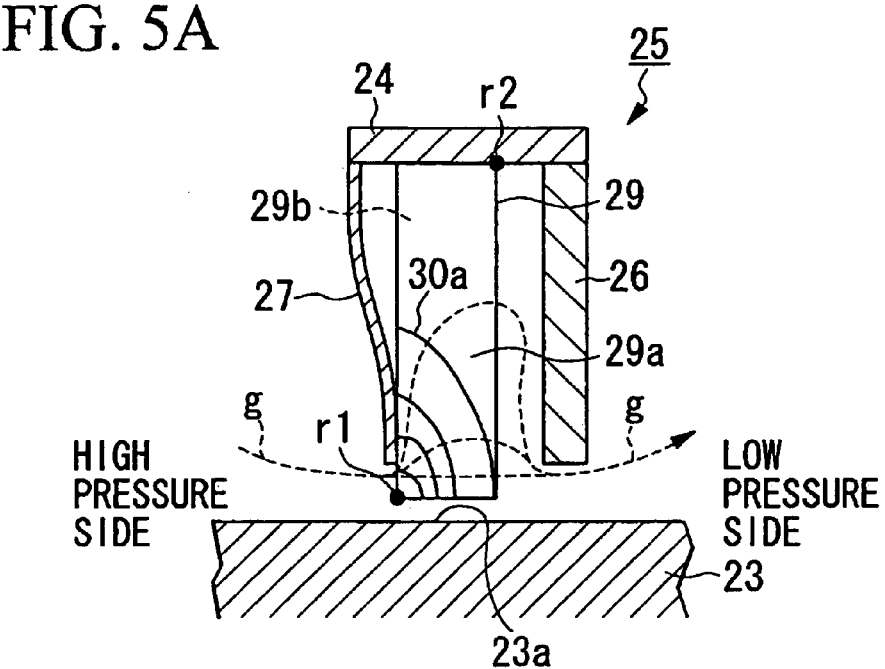
FIGS. 5A and 5B show a third embodiment of a leaf seal according to the present invention, being cross-sectional views from the cross-sectional face which passes the axial line of the rotary shaft.
Figure 5B:
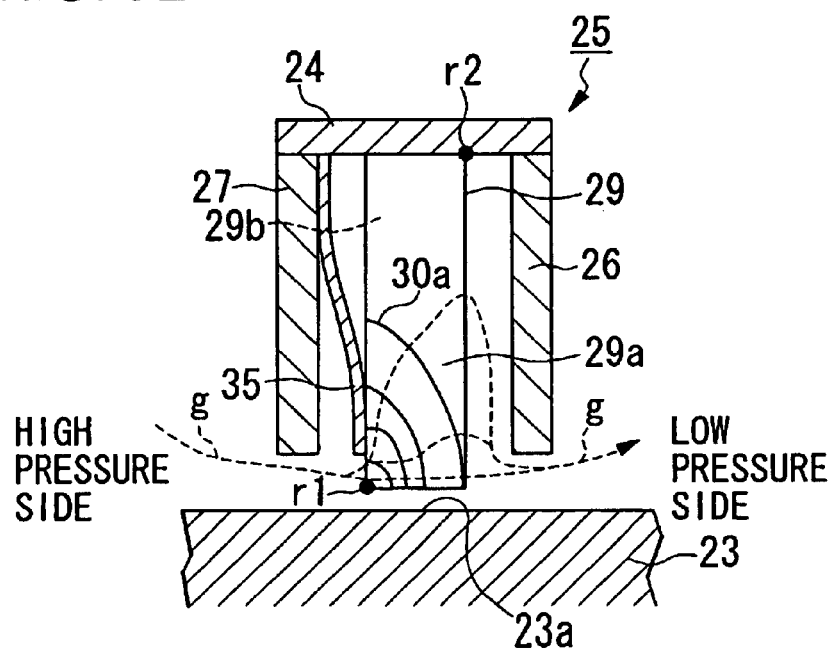

FIGS. 5A and 5B show the leaf seal 25 which is equipped with another pressure adjusting mechanism for creating a difference in pressure load between the top face 29a and the bottom face 29b of the thin plates 29 when pressure has been applied from the high pressure side, and thereby causing the tips of the thin plates 29 to rise. FIG. 5A shows an example where the high pressure side side-plate 27 comprises a low-relief plate which is flexible in the axial direction of the rotary shaft 23, and FIG. 5B shows an example where a thin plate for minutely adjusting the high pressure side gap 35 is flexible in the axial direction of the rotary shaft 23 and is provided between the high pressure side side-plate 27 and the thin plates 29.

By providing such high pressure side side-plate 27 and thin plate for minutely adjusting the high pressure side gap 35 having this type of flexibility, when pressured is applied from the high pressure side, the high pressure side gas pressure bends the high pressure side side-plate 27 and the thin plate for minutely adjusting the high pressure side gap 35 in the axial direction of the rotary shaft 23, enabling the gap between the high pressure side side-plate 27 and the thin plates 29 to be kept small. At this time, as shown in FIGS. 5A and 5B, the gas g, which flows along the top face 29a and bottom face 29b of the thin plates 29, enters between the peripheral face 23a of the rotary shaft 23 and the high pressure side side-plate 27 and flows radially in the direction from r1 to r2, whereby the low pressure region at the outer peripheral base expands. Consequently, at a given position along the cross-sectional face perpendicular to the width of the thin plates 29, the distribution of gas pressure applied to the top and bottom faces of the thin plates 29 is made triangular, decreasing gradually from the tip side of the thin plates 29 toward the outer peripheral side base.

Therefore, for the same reason as in the first embodiment, a difference in pressure distribution is obtained between the top face 29a and bottom face 29b of the thin plates 29, and the thin plates 29 are deformed so as to rise up higher than the peripheral face 23a of the rotary shaft 23, achieving a non-contacting state with the rotary shaft 23.

As in the first embodiment, the gas pressure distribution 30a, which is applied at a perpendicular to the top face 29a and bottom face 29b of the thin plates 29 by the gas g which passes through the gap 30, is shaped so that the gas pressure is highest at angular section r1, on the tip side of the thin plates 29 and on the high pressure side side-plate 27, and gradually weakens as it approaches a diagonally opposite angular section r2.

At this time, the pressure distribution in the radial direction of the cross-sectional face at a given position in the axial direction width of the thin plates 29 is that shown as gas pressure distributions 30b and 30c in the first embodiment of FIG. 3B, creating a pressure load difference (Fb+Fc)>Fa) between the top face 29a, and the bottom face 29b and the thin plate tip side 29c; this pressure load difference acts as a force in the direction which the tips of the thin plates 29 rise in.

Therefore, the pressure load difference in the thin plates 29 acts as a force which makes the tips of the thin plates 29 rise. In comparison with the first embodiment, this embodiment has merits of ease of assembly and inexpensive manufacturing cost for the same reasons as explained in the second embodiment, and the seal pressure enables the gap, that is, the gap between the thin plates 29 and the high pressure side side-plate 27 or the thin plate for minutely adjusting the high pressure side gap 35, to be automatically made with high precision.

(Fourth Embodiment)

Next, a fourth embodiment of the present invention will be explained with reference to FIGS. 6A and 6B. The explanation will center on the characteristic parts, and parts which are identical to those in the first embodiment will not be explained further. In this embodiment, the gas pressure adjusting mechanism comprises slitted flexible plates, which are flexible in the direction of the rotary shaft 23 and are arranged on the high pressure side of the thin plates 29 and comprise slits at more than two places along the entire rim.

Figure 6A:
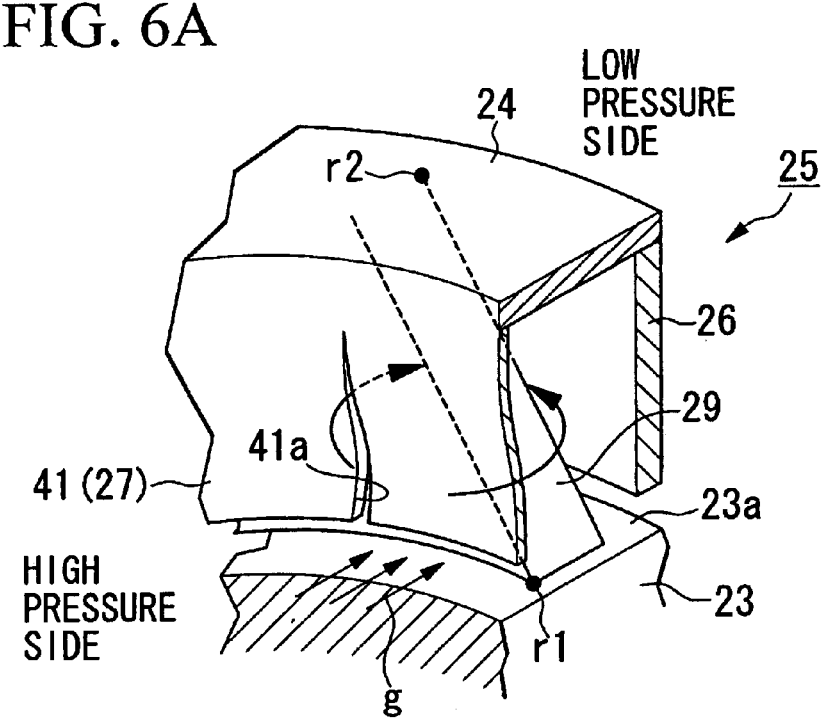
FIGS. 6A and 6B show a fourth embodiment of a leaf seal according to the present invention.
Figure 6B:
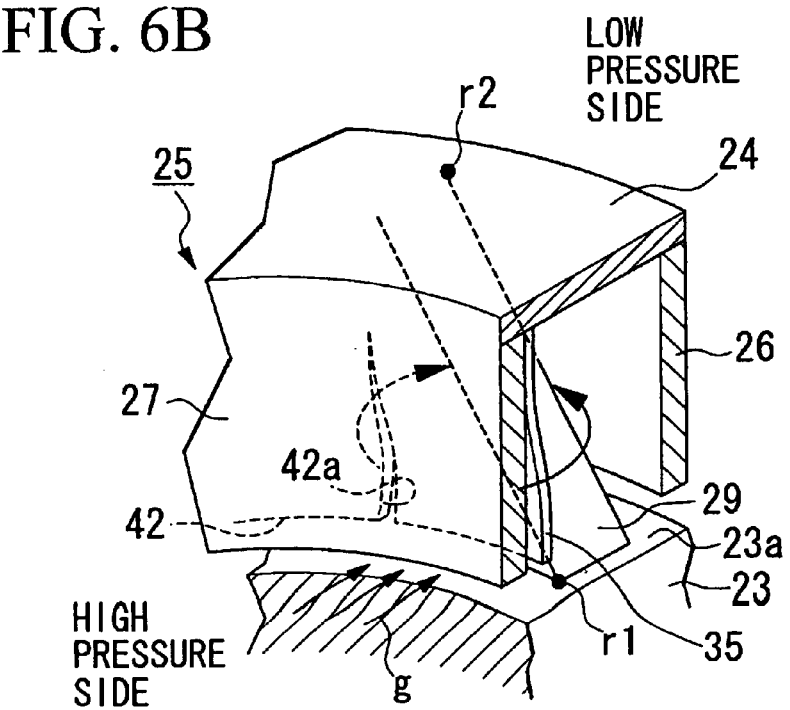

FIG. 6A shows a case in which the high pressure side side-plate 27 is a slitted flexible plate 41 having slits 41a at more than two places on its entire rim and being flexible in the axial direction of the rotary shaft 23. FIG. 6B shows a case in which a low-relief plate having slits 42a at more than two places on its entire rim and being flexible in the axial direction of the rotary shaft 23 is provided in the gap between the high pressure side side-plate 27 and the thin plates 29 as a slitted flexible plate 42.

By providing the slitted flexible plates 41 and 42 of this type, when pressure is applied from the high pressure side, the high pressure side gas pressure forces the high pressure side side-plate 27, or a thin plate for minutely adjusting the high pressure side gap 42, to bend in the axial direction of the rotary shaft 23, enabling the gap between the high pressure side side-plate 27 and the thin plates 29 to be kept small. At this time, as shown in FIGS. 6A and 6B, the gas g, which flows along the top face 29a and bottom face 29b of the thin plates 29, enters between the peripheral face 23a of the rotary shaft 23 and the high pressure side side-plate 27, and flows radially in the direction from r1 to r2, whereby the low pressure region at the outer peripheral base expands. Consequently, at a given position along the cross-sectional face perpendicular to the width of the thin plates 29, the distribution of gas pressure applied to the top and bottom faces of the thin plates 29 is made triangular, decreasing gradually from the tip side of the thin plates 29 toward the outer peripheral side base.

Therefore, for the same reasons as in the first embodiment, a difference in pressure distribution is obtained between the top face 29a and bottom face 29b of the thin plates 29, and the thin plates 29 are deformed so as to rise up higher than the peripheral face 23a of the rotary shaft 23, achieving a non-contacting state with the rotary shaft 23.

As in the first embodiment, the gas pressure distribution 30a, which is applied at a perpendicular to the top face 29a and bottom face 29b of the thin plates 29 by the gas g which passes through the gap 30, is shaped so that the gas pressure is highest at angular section r1, on the tip side of the thin plates 29 and on the high pressure side side-plate 27, and gradually weakens as it approaches a diagonally opposite angular section r2.

At this time, the pressure distribution in the radial direction of the cross-sectional face at a given position in the axial direction width of the thin plates 29 is that shown as gas pressure distributions 30b and 30c in the first embodiment of FIG. 3B, creating a pressure load difference (Fb+Fc)>Fa) between the top face 29a, and the bottom face 29b and the thin plate tip side 29c; this pressure load difference acts as a force in the direction which the tips of the thin plates 29 rise in.

Therefore, the pressure load difference in the thin plates 29 acts as a force which makes the tips of the thin plates 29 rise. In comparison with the first embodiment, this embodiment has merits of ease of assembly and inexpensive manufacturing cost for the same reasons as explained in the second embodiment, and the seal pressure enables the gap, that is, the gap between the thin plates 29 and the slitted flexible plates 41 and 42, to be automatically made with high precision. This embodiment is superior to the first embodiment with regard to ease of assembly and manufacturing cost, and, in addition, is superior to the third embodiment in that minute adjustment of the gap, that is, the gap between the thin plates 29 and the slitted flexible plates 41 and 42, is possible due to shape of the slits 41a and 42a.

(Fifth Embodiment)

Next, a fifth embodiment of the present invention will be explained with reference to FIG. 7. The explanation will center on the characteristic parts, and parts which are identical to those in the first embodiment will not be explained further. In this embodiment, the gas pressure adjusting mechanism comprises a plurality of draft holes, provided through the low pressure side side-plate 26 in the axial direction of the rotary shaft 23.

Figure 7:
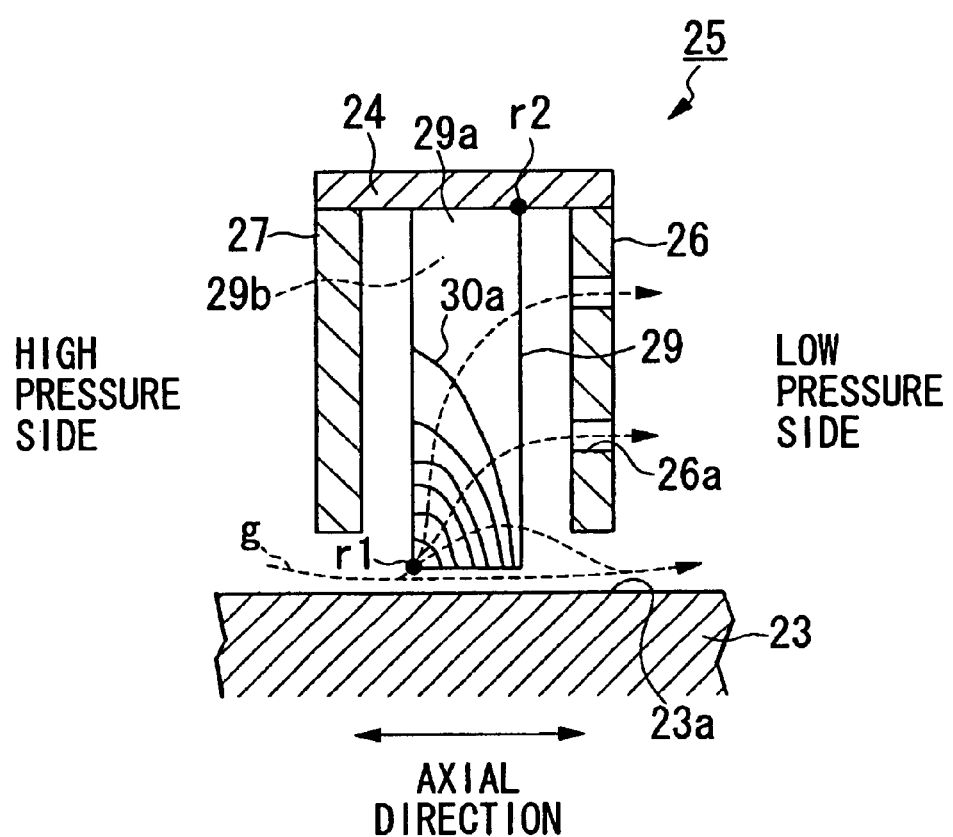
FIG. 7 shows a fifth embodiment of a leaf seal according to the present invention, being a cross-sectional view from the cross-sectional face which passes the axial line of the rotary shaft.

FIG. 7 shows a cross-section view of the leaf seal 25 from the cross-section which passes through the axial line of the rotary shaft 23; reference numeral 26a represents a draft hole. In an alternative constitution, a porous material can be used as the low pressure side side-plate 26.

By using the low pressure side side-plate 26 comprising these draft holes 26a, the gas pressure distribution, which is applied at a perpendicular to the top face 29a and bottom face 29b of the thin plates 29 by the gas g which passes through the gap 30, becomes the isobaric line of distribution shown by the pressure distribution 30a in the first embodiment. That is, the gas pressure is highest at angular section r1, on the tip side of the thin plates 29 and on the high pressure side side-plate 27, and gradually weakens as it approaches a diagonally opposite angular section r2.

At this time, the pressure distribution in the radial direction of the cross-sectional face at a given position in the axial direction width of the thin plates 29 is that shown as gas pressure distributions 30b and 30c in the first embodiment of FIG. 3B, creating a pressure load difference (Fb+Fc)>Fa) between the top face 29a, and the bottom face 29b and the thin plate tip side 29c; this pressure load difference acts as a force in the direction which the tips of the thin plates 29 rise in.

Therefore, the pressure load difference in the thin plates 29 acts as a force which makes the tips of the thin plates 29 rise. Moreover, since all that is needed is to provide the holes for the draft holes 26a, assembly is easy and manufacturing cost is reduced. In addition, complex pressure distribution can be achieved by adjusting the arrangement and size of the holes. The exposed section of the thin plates 29 is smaller than in the second embodiment, reducing deformation of the thin plates due to contact and the like at the time of assembly.

(Sixth Embodiment)

Next, a sixth embodiment of the present invention will be explained with reference to FIGS. 8A and 8B. The explanation will center on the characteristic parts, and parts which are identical to those in the first embodiment will not be explained further. In this embodiment, a gap size adjusting mechanism for ensuring that the low pressure side gap 31 is always larger than the high pressure side gap 32.

Figure 8A:
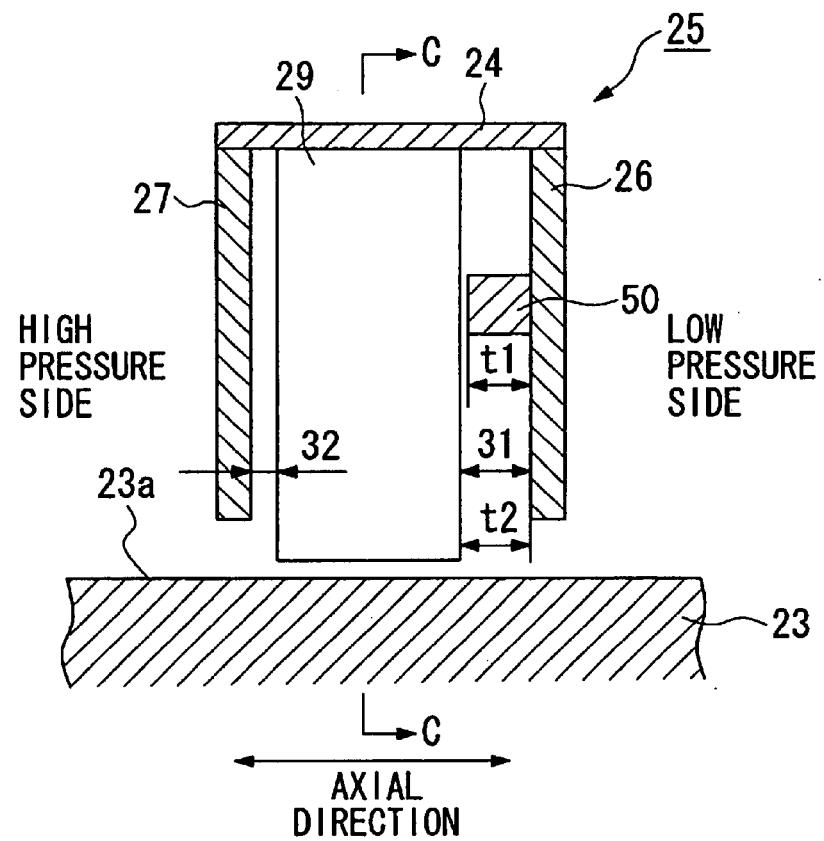
FIGS. 8A and 8B show a sixth embodiment of a leaf seal according to the present invention, FIG. 8A being a cross-sectional view from the cross-sectional face which passes the axial line of the rotary shaft, and FIG. 8B being a a cross-sectional view taken along the line C—C of FIG. 8A.
Figure 8B:
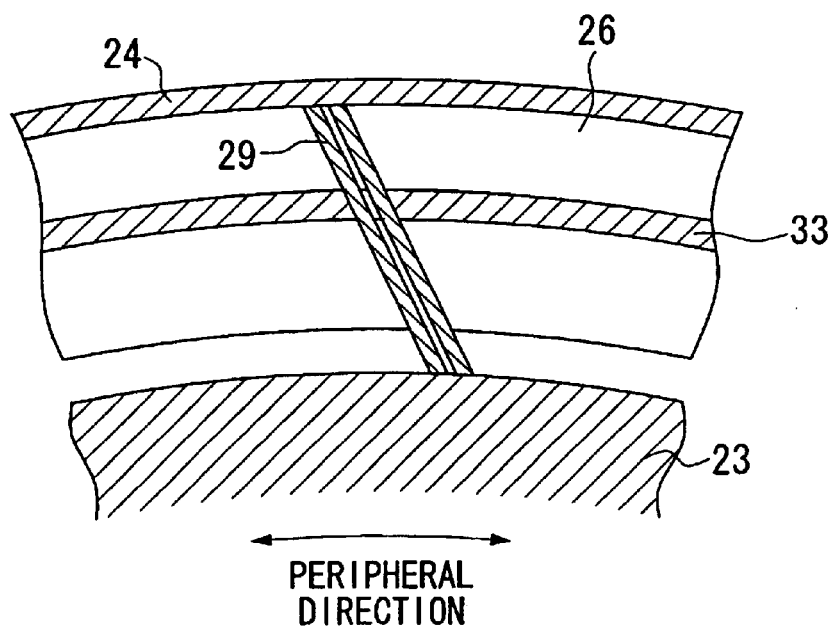

FIG. 8A is a cross-sectional view of the leaf seal 25 from the cross-sectional face which passes the axial line of the rotary shaft 23, and FIG. 8B is a cross-sectional view taken along the line C—C in FIG. 8A.

As shown in FIGS. 8A and 8B, the gap size adjusting mechanism comprises a first step section 50, provided between the low pressure side side-plate 26 and the thin plates 29, for supporting the thin plate 29 and maintaining the size of the low pressure side gap 31 between the low pressure side side-plate 26 and the thin plate 29 when the thin plate 29 attempts to move toward the low pressure side side-plate 26.

As shown in FIG. 8A, when viewed along the cross-sectional face which passes the axial line of the rotary shaft 23, the first step section 50 is provided on the side of the low pressure side side-plate 26 and protrudes toward the thin plates 29 side. As shown in FIG. 8B, when viewed from the cross-sectional face which crosses the axial line of the rotary shaft 23 at a perpendicular, the first step section 50 has a ring shape which runs along the ring low pressure side side-plate 26 and continues across the entire rim of the rotary shaft 23. The first step section 50 may be a separate component from the low pressure side side-plate 26 or may be provided together with the low pressure side side-plate 26.

In order to support the thin plates 29, the first step section 50 must be extremely close to the thin plates 29 side. However, the first step section 50 must not be so close that it presses against the edges of the thin plates 29 and causes them to deform. For this reason, when t1 represents the thickness of the first step section 50 (the thickness in the axial direction of the rotary shaft 23) and t2 represents the size of the low pressure side gap 31, then t2=t1. That is, the thickness t1 must be equal to, or narrower than, the gap size t2 of the low pressure side gap 31.

According to the first step section 50, the size of the low pressure side gap 31 can be prevented from dropping below t2 by restricting deviation and deformation of the thin plates 29, enabling a predetermined gap to be maintained easily.

In the leaf seal 25, that is, the shaft seal and the gas turbine equipped with the leaf seal 25 as described in the above embodiments, the first step section 50 supports the thin plate 29 and stops the thin plate 29 from moving toward the low pressure side side-plate 26 side. Therefore, even when assembly errors are made at the time of assembling the shaft seal, and when the thin plates 29 suffer deformation and the like due to the pressure of gas flowing from the high pressure side to the low pressure side during operation, the gap between the thin plates 29 and the low pressure side side-plate 26 can be maintained at the predetermined distance of t2.

Consequently, it becomes possible to reliably perform the gap adjustment, described in the first embodiment, of making the low pressure side gap 31 between the thin plates 29 and the low pressure side side-plate 26 larger than the high pressure side gap 32 between the thin plates 29 and the high pressure side side-plate 27. Even when there is only a small dynamic pressure at start-up, the tips of the thin plates 29 can be reliably made to rise up to reach a state of non-contact with the peripheral face 23a of the rotary shaft 23. Therefore, generation of excessive heat and corrosion, caused by contact between the thin plates 29 and the rotary shaft 23, can be prevented. Moreover, by preventing heat generation caused by contact between the thin plates 29 and the rotary shaft 23, it is possible to prevent vibration caused by the thermal balance of the rotary shaft 23. In addition to these effects, the other effects of the first embodiment are, of course, also obtained.

(Seventh Embodiment)

A seventh embodiment of the present invention will be explained with reference to FIGS. 9A and 9B. This embodiment corresponds to a modification of the sixth embodiment, and the explanation will center on the points of difference with the sixth embodiment; parts which are identical to those in the sixth embodiment will not be explained further.

Figure 9A:
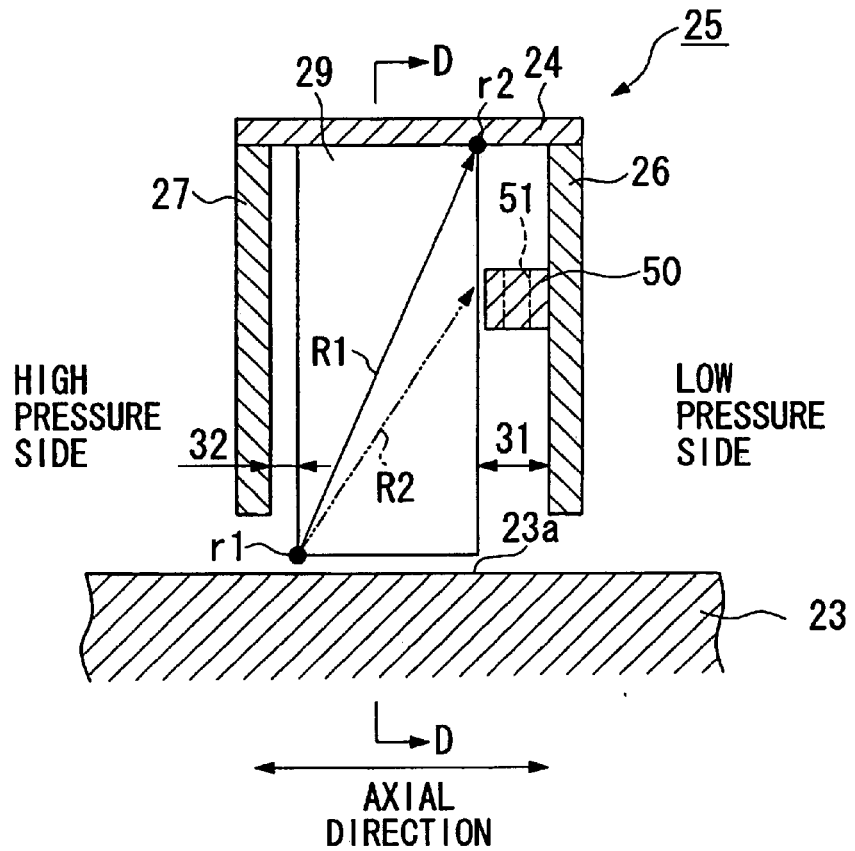
FIGS. 9A and 9B show a seventh embodiment of a leaf seal according to the present invention, FIG. 9A being a cross-sectional view from the cross-sectional face which passes the axial line of the rotary shaft, and FIG. 9B being a cross-sectional view taken along the line D—D of FIG. 9A.
Figure 9B:
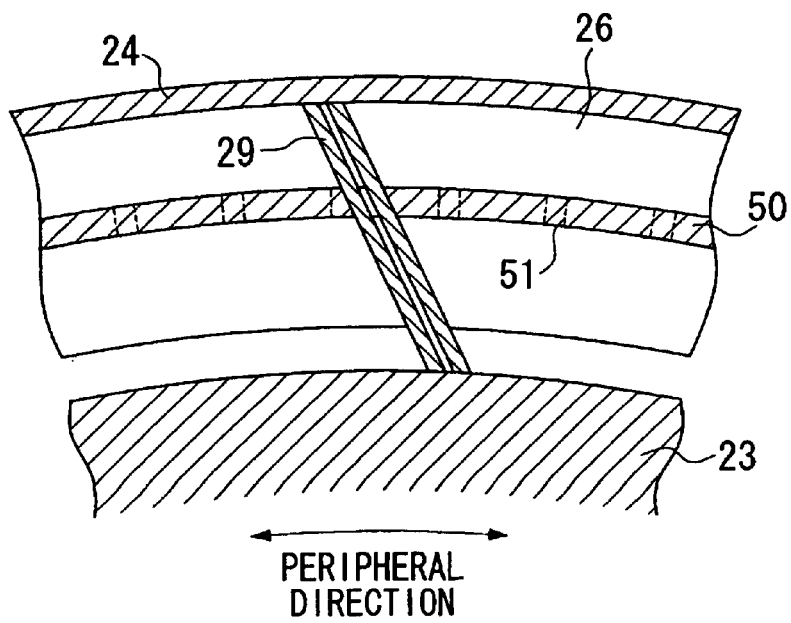

FIG. 9A is a cross-sectional view of the leaf seal 25 from the cross-sectional face which passes the axial line of the rotary shaft 23, and FIG. 9B is a cross-sectional view taken along the line D—D of FIG. 9A.

As shown in FIGS. 9A and 9B, this embodiment is characterized in that ventilation holes 51 are provided in the ring first step section 50 described in the sixth embodiment, and form a space which joins the inner peripheral side to the outer peripheral side. As shown in FIG. 9B, a plurality of the ventilation holes 51 are provided with equal distances therebetween.

Providing the plurality of ventilation holes 51 along the first step section 50 in this way reduces resistance to the flow of gas between the rotary shaft radial direction inner peripheral side and the rotary shaft radial direction outer peripheral side, with the first step section 50 as a boundary, in the gap space between the thin plate 29 and the low pressure side side-plate 26. Consequently, the first step section 50 continues to support the thin plates 29, while achieving pressure distribution in the radial direction of the rotary shaft just as though the first step section 50 did not exist.

Therefore, when the pressure of gas flowing from the high pressure side side-plate 27 to the low pressure side side-plate 26 is applied to the thin plates 29, the gas pressure distribution over a wide range (the area represented by a solid line arrow R1 in FIG. 9A) can be made such that the gas pressure against the top and bottom faces of the thin plates 29 is highest at an angular section r1 at the tip side opposite to the rotary shaft 23 and on the side of the high pressure side side-plate 27, and gradually weakens as it approaches the diagonally opposite angular section r2, avoiding gas distribution over a narrow range such as that shown by the double-dotted line arrow R2 in FIG. 9A.

Therefore, since a wide gas pressure distribution can be applied to the thin plates 29, the pressure difference on the top and bottom faces of the thin plates 29 can be reliably achieved throughout a wide area, making it possible to reliably adjust the gas pressure so that the thin plates 29 rise up higher than the peripheral face 23a of the rotary shaft 23.

(Eighth Embodiment)

An eighth embodiment of this invention will be explained with reference to FIGS. 10A to 10C. This embodiment corresponds to a modification of the sixth embodiment, and the explanation will center on the points of difference with the sixth embodiment; parts which are identical to those in the sixth embodiment will not be explained further.

Figure 10A:
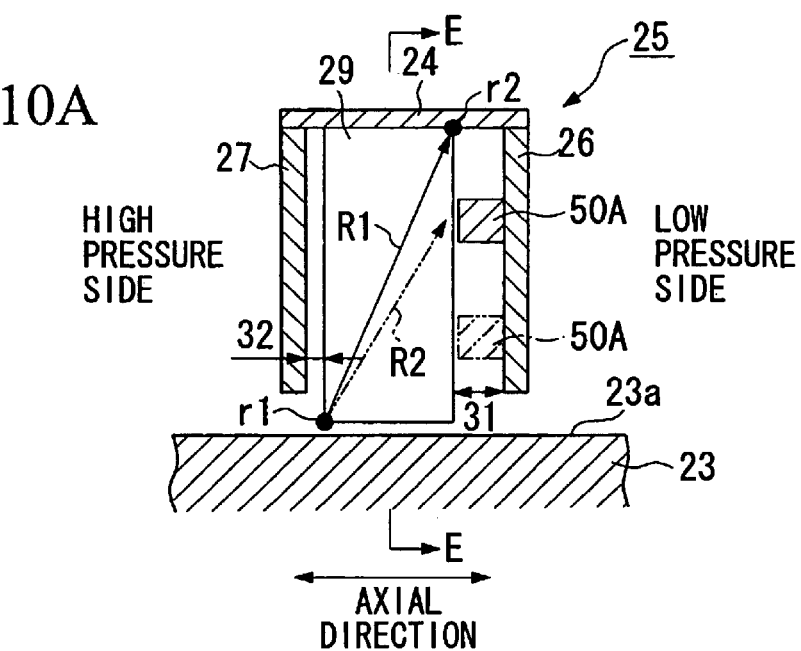
FIGS. 10A to 10C show an eighth embodiment of a leaf seal according to the present invention, FIG. 10A being a cross-sectional view from the cross-sectional face which passes the axial line of the rotary shaft, and FIGS. 10B and 10C being cross-sectional views taken along the line E—E of FIG. 10A.
Figure 10B:
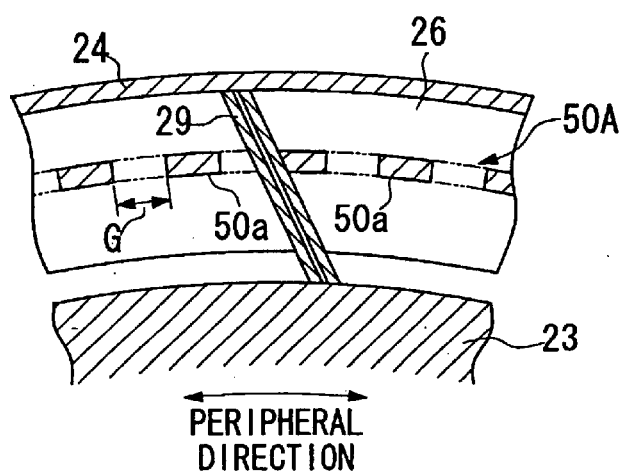
Figure 10C:
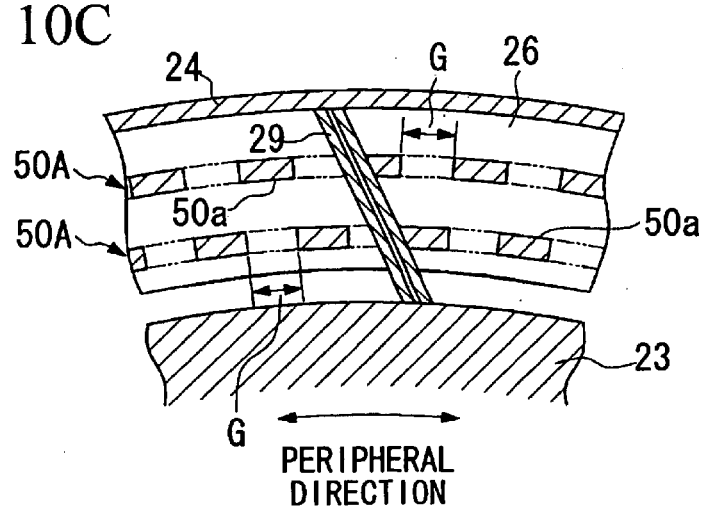

FIG. 10A is a cross-sectional view of the leaf seal 25 from the cross-sectional face which passes the axial line of the rotary shaft 23, and FIGS. 10B and 10C are cross-sectional views taken along the line E—E of FIG. 10A.

As shown in FIG. 10B, instead of the first step section 50 continuing in a ring along the entire rim as described in the sixth embodiment, this embodiment is characterized in having a step second section 50A comprising a plurality of ring divided plates 50a, provided intermittently with equal intervals G therebetween along the low pressure side side-plate 26 so as to form a ring around the rotary shaft 23, the second step section 50A being secured to the low pressure side side-plate 26. As shown in FIG. 10A, when viewed from the cross-sectional face which passes the axial line of the rotary shaft 23, the second step section 50A is provided on the low pressure side side-plate 26 so as to protrude toward the thin plates 29 side.

The second step section 50A comprising the ring divided plates 50a may be a separate component from the low pressure side side-plate 26 or may be provided together with the low pressure side side-plate 26.

In this embodiment, the intervals G fulfil the function of the ventilation holes 51 of the seventh embodiment, thereby reducing resistance to the flow of gas between the rotary shaft radial direction inner peripheral side and the rotary shaft radial direction outer peripheral side, with the second step section 50A as a boundary, in the gap space between the thin plate 29 and the low pressure side side-plate 26. Consequently, the thin plates 29 are supported by the second step section 50A while pressure distribution is achieved in the radial direction of the rotary shaft just as though the second step section 50A did not exist.

Therefore, when the pressure of gas flowing from the high pressure side side-plate 27 to the low pressure side side-plate 26 is applied to the thin plates 29, the gas pressure distribution over a wide range (the area represented by a solid line arrow R1 in FIG. 10A) can be made such that the gas pressure against the top and bottom faces of the thin plates 29 is highest at an angular section r1 at the tip side opposite to the rotary shaft 23 and on the side of the high pressure side side-plate 27, and gradually weakens as it approaches the diagonally opposite angular section r2, avoiding gas distribution over a narrow range such as that shown by the double-dotted line arrow R2 in FIG. 10A.

Therefore, since a wide gas pressure distribution can be applied to the thin plates 29, the pressure difference on the top and bottom faces of the thin plates 29 can be reliably achieved throughout a wide area, making it possible to reliably adjust the gas pressure so that the thin plates 29 rise up higher than the peripheral face 23a of the rotary shaft 23.

Incidentally, as an example of one modification of this embodiment, as shown in FIG. 10C, two of the second step section 50A, i.e., two steps can of course be provided concentrically around the rotary shaft 23; three or more may be provided, which is not shown.

(Ninth Embodiment)

A ninth embodiment of this invention will be explained with reference to FIGS. 11A to 11C. This embodiment corresponds to a modification of the sixth embodiment, and the explanation will center on the points of difference with the sixth embodiment; parts which are identical to those in the sixth embodiment will not be explained further.

Figure 11A:
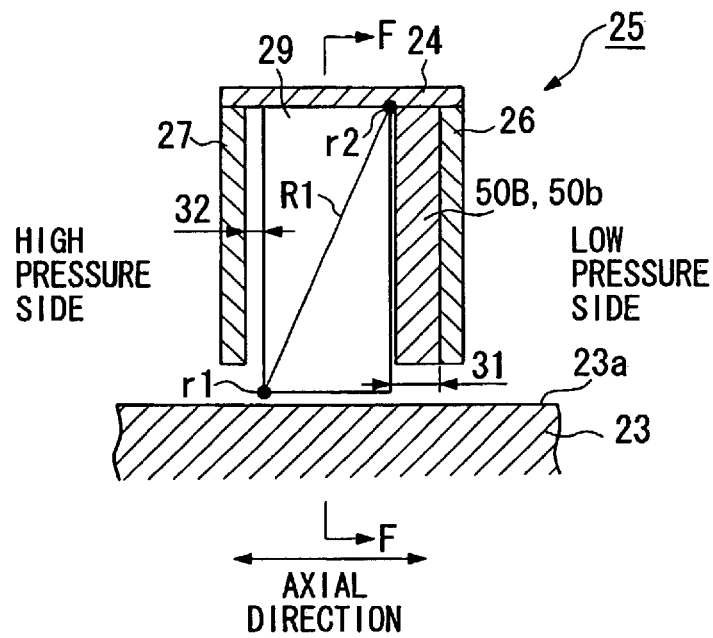
FIGS. 11A to 11C show a ninth embodiment of a leaf seal according to the present invention, FIG. 11A being a cross-sectional view from the cross-sectional face which passes the axial line of the rotary shaft, and FIGS. 11B and 11C being cross-sectional views taken along the line F—F of FIG. 11A.
Figure 11B:
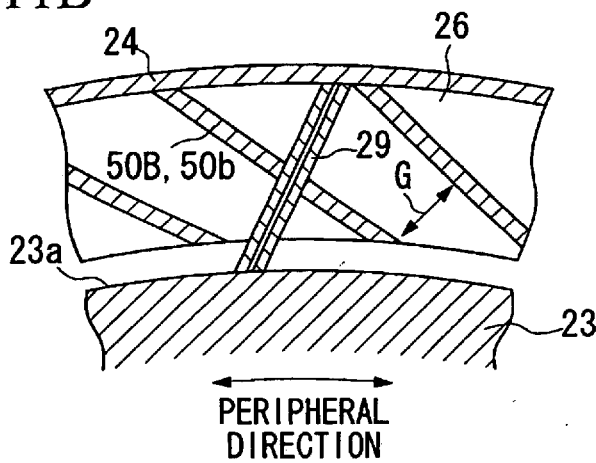
Figure 11C:
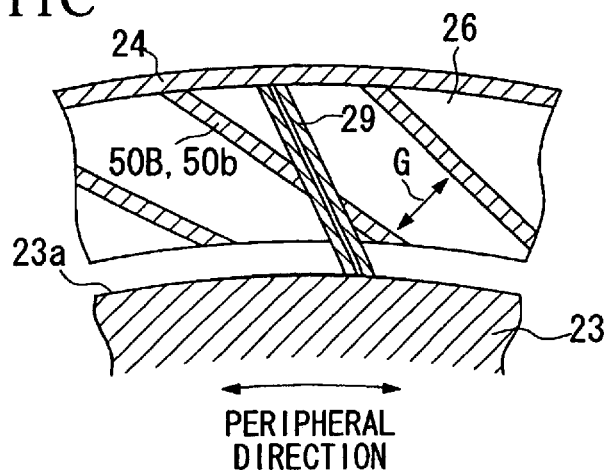

FIG. 11A is a cross-sectional view of the leaf seal 25 from the cross-sectional face which passes the axial line of the rotary shaft 23, and FIGS. 11B and 11C are cross-sectional views taken along the line F—F of FIG. 11A.

As shown in FIG. 11B, instead of the step section 50 continuing in a ring along the entire rim as described in the sixth embodiment, this embodiment is characterized in having a third step section 50B which comprises a plurality of spiral plates 50b, which, when the low pressure side side-plate 26 is viewed from the thin plates 29 side, are provided spirally from the rotary shaft radial direction inner peripheral side to the rotary shaft radial direction outer peripheral side of the low pressure side side-plate 26 with equal intervals G therebetween; the third step section 50B is secured to the low pressure side side-plate 26. As shown in FIG. 11A, when viewed from the cross-sectional face which passes the axial line of the rotary shaft 23, the third step section 50B is provided on the low pressure side side-plate 26 side so as to protrude toward the thin plates 29.

When the low pressure side side-plate 26 is viewed from the thin plates 29 side, i.e. the view shown in FIG. 11B, the spiral plates 50b are secured to the low pressure side side-plate 26 at a gradient which intersects with the thin plates 29 in a cross arrangement.

The third step section 50B comprising the spiral plates 50b may be a separate component from the low pressure side side-plate 26 or may be provided together with the low pressure side side-plate 26.

FIG. 11C shows an example of one modification of this embodiment, wherein, when the low pressure side side-plate 26 is viewed from the thin plates 29 side, the spiral plates 50b are secured to the low pressure side side-plate 26 in the same direction as the thin plates 29 but at a different gradient angle, i.e. a different gradient angle with the peripheral face 23a of the rotary shaft 23. However, the cross arrangement of FIG. 11B is more preferable, since this arrangement enables a greater number of thin plates 29 to be supported by each spiral plate 50b.

In this embodiment, the intervals G fulfil the function of the ventilation holes 51 of the seventh embodiment, thereby reducing resistance to the flow of gas between the rotary shaft radial direction inner peripheral side and the rotary shaft radial direction outer peripheral side, with the third step section 50B as a boundary, in the gap space between the thin plate 29 and the low pressure side side-plate 26. Consequently, the thin plates 29 are supported by the third step section 50B while pressure distribution is achieved in the radial direction of the rotary shaft just as though the third step section 50B did not exist.

Therefore, when the pressure of gas flowing from the high pressure side side-plate 27 to the low pressure side side-plate 26 is applied to the thin plates 29, the gas pressure distribution over a wide range (the area represented by a solid line arrow R1 in FIG. 11A) can be made such that the gas pressure against the top and bottom faces of the thin plates 29 is highest at an angular section r1 at the tip side opposite to the rotary shaft 23 and on the side of the high pressure side side-plate 27, and gradually weakens as it approaches the diagonally opposite angular section r2, avoiding gas distribution over a narrow range.

Therefore, since a wide gas pressure distribution can be applied to the thin plates 29, the pressure difference on the top and bottom faces of the thin plates 29 can be reliably achieved throughout a wide area, making it possible to reliably adjust the gas pressure so that the thin plates 29 rise up higher than the peripheral face 23a of the rotary shaft 23.

(Tenth Embodiment)

A tenth embodiment of this invention will be explained with reference to FIG. 12. This embodiment corresponds to a modification of the sixth embodiment, and the explanation will center on the points of difference with the sixth embodiment; parts which are identical to those in the sixth embodiment will not be explained further.

Figure 12:
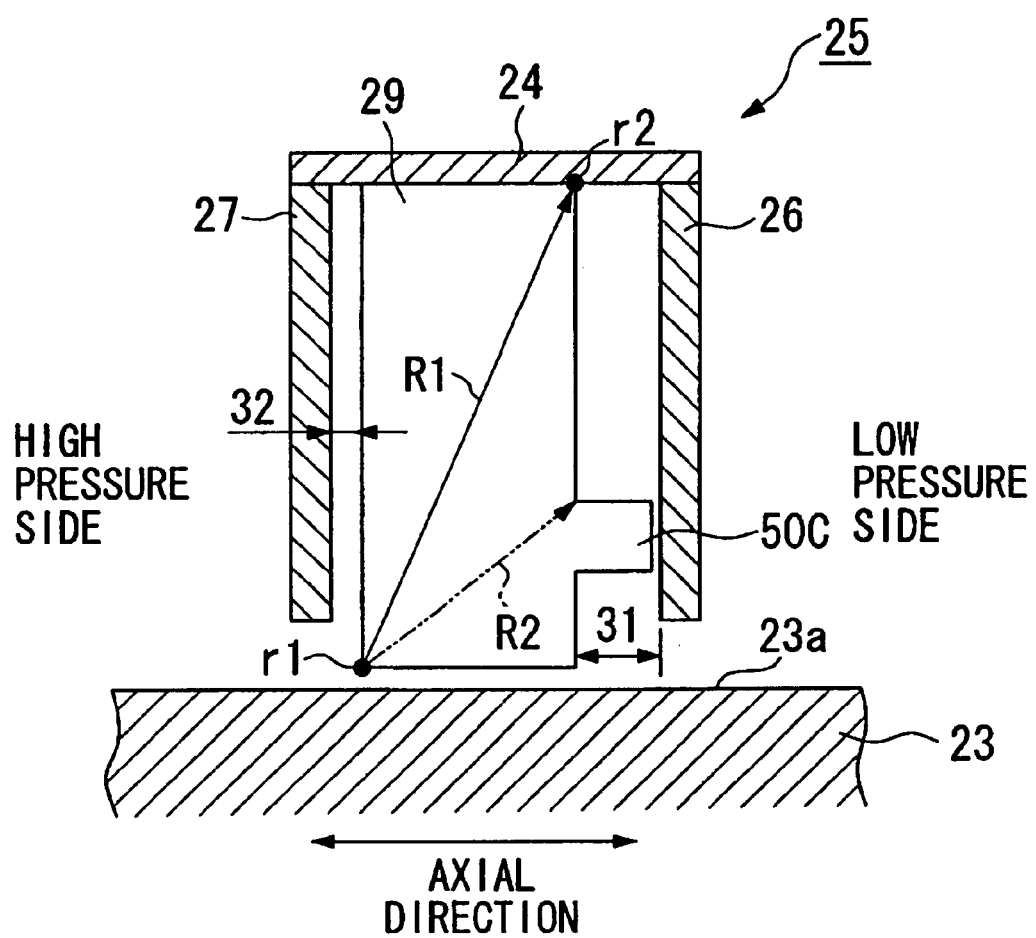
FIG. 12 shows a tenth embodiment of a leaf seal according to the present invention, being a cross-sectional view from the cross-sectional face which passes the axial line of the rotary shaft.

FIG. 12 a cross-sectional view of the leaf seal 25 from the cross-sectional face which passes the axial line of the rotary shaft 23.

As shown in FIG. 12, instead of the step section 50 which is provided on the low pressure side side-plate 26 as described in the sixth embodiment, this embodiment is characterized in having a fourth step section 50C which is provided to each of the thin plates 29 so as to protrude toward the low pressure side side-plate 26.

The fourth step sections 50C are protruding sections, formed integrally with the thin plates 29, and the gaps between them are the same size as the gaps between the thin plates 29.

In this embodiment, the gaps between the fourth step sections 50C fulfill the function of the ventilation holes 51 of the seventh embodiment, thereby reducing resistance to the flow of gas between the rotary shaft radial direction inner peripheral side and the rotary shaft radial direction outer peripheral side, with the fourth step section 50C as a boundary, in the gap space between the thin plate 29 and the low pressure side side-plate 26. Consequently, the thin plates 29 are supported by the fourth step sections 50C while pressure distribution is achieved in the radial direction of the rotary shaft just as though the fourth step sections 50C did not exist.

Therefore, when the pressure of gas flowing from the high pressure side side-plate 27 to the low pressure side side-plate 26 is applied to the thin plates 29, the gas pressure distribution wherein the gas pressure against the top and bottom faces of the thin plates 29 is highest at an angular section r1 at the tip side opposite to the rotary shaft 23 and on the side of the high pressure side side-plate 27, and gradually weakens as it approaches the diagonally opposite angular section r2, can be spread over a wide range (the area represented by a solid line arrow R1 in FIG. 12), thereby avoiding gas distribution over a narrow range, such as that shown, for example, by the double-dotted line arrow R2 in FIG. 12.

Therefore, since a wide gas pressure distribution can be applied to the thin plates 29, the pressure difference on the top and bottom faces of the thin plates 29 can be reliably achieved throughout a wide area, making it possible to reliably adjust the gas pressure so that the thin plates 29 rise up higher than the peripheral face 23a of the rotary shaft 23.

In this embodiment, the shape of the thin plates 29 is merely changed, and there is no need to process the low pressure side side-plate 26 or add extra attachments thereto. Therefore, this embodiment has an advantage of low manufacturing cost.

(Eleventh Embodiment)

An eleventh embodiment of this invention will be explained with reference to FIG. 13. This embodiment corresponds to a modification of the sixth embodiment, and the explanation will center on the points of difference with the sixth embodiment; parts which are identical to those in the sixth embodiment will not be explained further.

Figure 13:
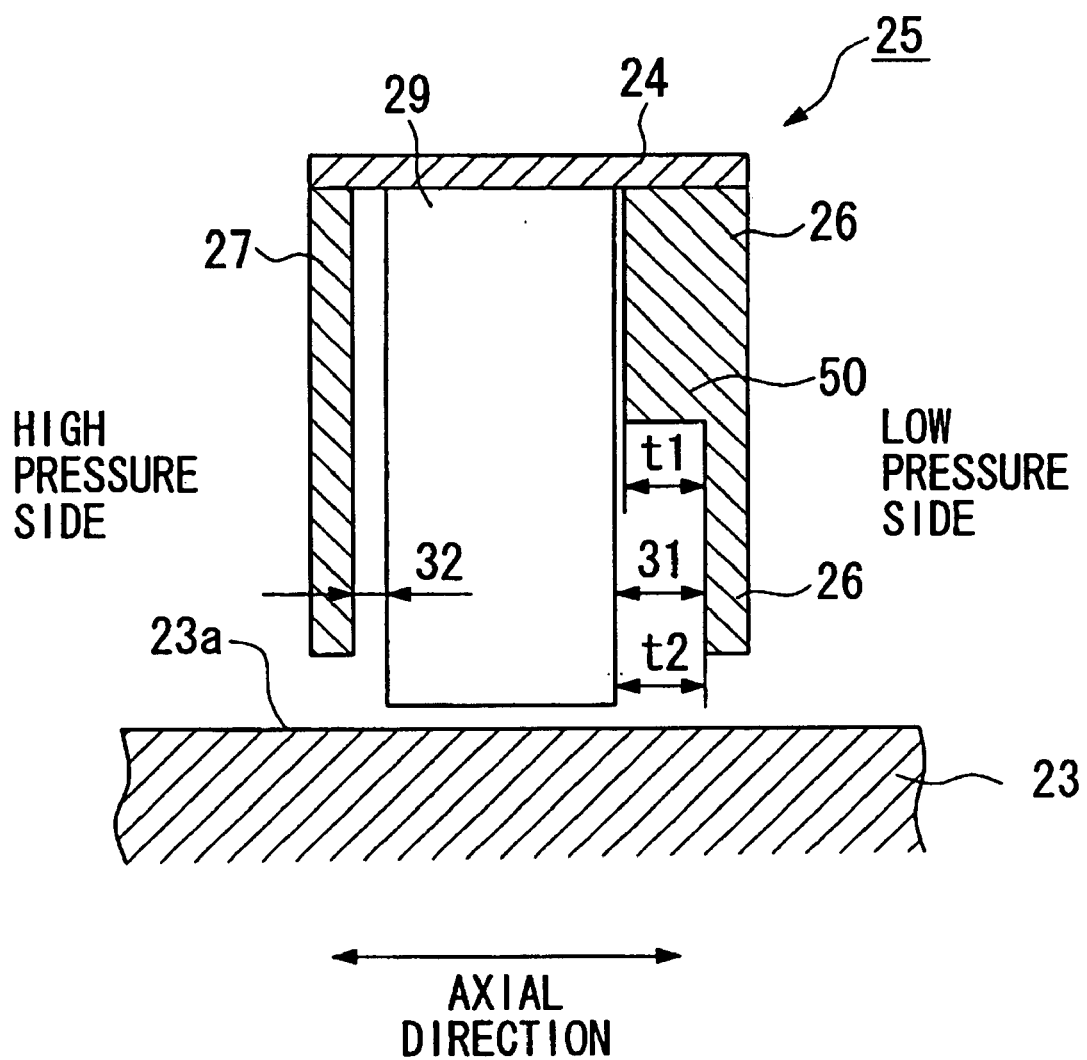
FIG. 13 shows an eleventh embodiment of a leaf seal according to the present invention, being a cross-sectional view from the cross-sectional face which passes the axial line of the rotary shaft.

FIG. 13 is a cross-sectional view of the leaf seal 25 from the cross-sectional face which passes the axial line of the rotary shaft 23.

As shown in FIG. 13, this embodiment is characterized in that the first step section 50 in a ring shape described in the sixth embodiment continues along the radial direction of the low pressure side side-plate 26 to the casing 24. That is, when viewed in cross-section as in FIG. 13, the first step section 50 of this embodiment is provided widely so as to continue to the base of the low pressure side side-plate 26, which is the section connecting the casing 24 and the low pressure side side-plate 26. During normal operation, the face of the first step section 50 which is facing the thin plates 29 does not directly contact the thin plates 29, and there is a small gap between the two.

According to the first step section 50, the size of the low pressure side gap 31 can be prevented from dropping below t2 by restricting deviation and deformation of the thin plates 29, enabling a predetermined gap to be maintained easily.

According to the leaf seal 25 of the embodiment described above and a gas turbine equipped with the shaft seal 25, when the thin plate 29 attempts to move near the side of the low pressure side side-plate 26, the first step section 50 supports the thin plate 29 and stops it from moving nearer. Therefore, even when assembly errors are made at the time of assembling the shaft seal, and when the thin plates suffer deformation and the like due to the pressure of gas flowing from the high pressure side to the low pressure side during operation, the gap 31 between the thin plates 29 and the low pressure side side-plate 26 can be kept at the predetermined size t2.

Since the gaps 31 and 32 between the thin plates 29 and the side-plates 26 and 27 can be kept at the predetermined sizes, even when there is some pressure fluctuation between the high pressure side and low pressure side, the sizes of the gaps are unlikely to change. Therefore, the area over which the seal pressure is applied can be enlarged. Further, since there is a small gap between the first step section 50 and the thin plates 29, the tolerances of the gaps between the high pressure side side-plate 27 and 26 and the thin plates 29 can be designed more freely, enabling processing cost to be reduced.

In addition, the same effects of the sixth embodiment can of course be obtained.

(Twelfth Embodiment)

A twelfth embodiment of this invention will be explained with reference to FIG. 14. This embodiment corresponds to a modification of the eleventh embodiment, and the explanation will center on the points of difference with the eleventh embodiment; parts which are identical to those in the eleventh embodiment will not be explained further.

Figure 14:
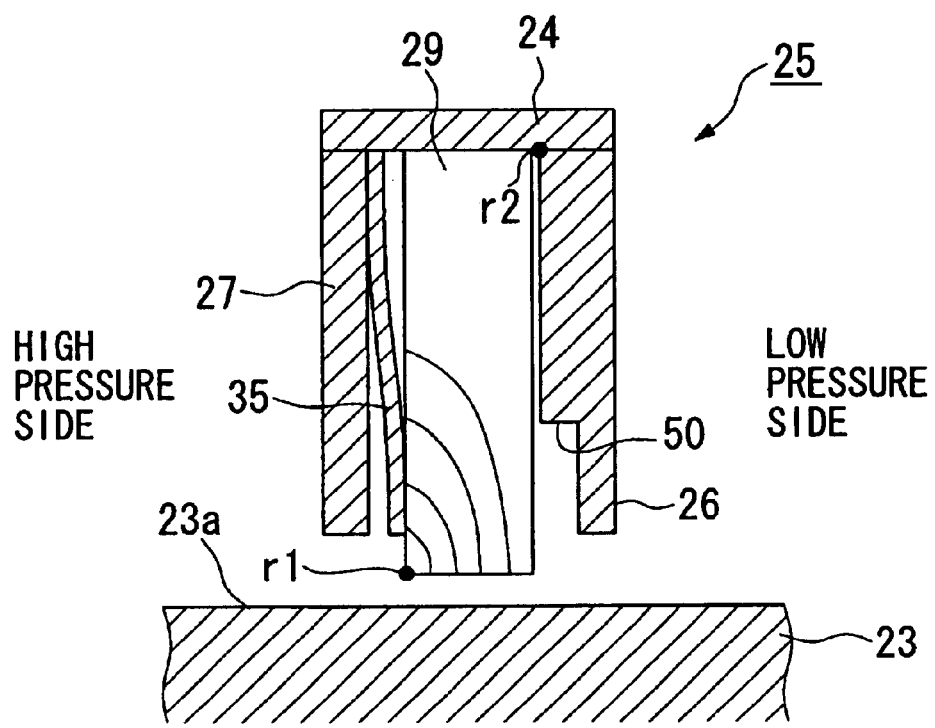
FIG. 14 shows a twelfth embodiment of a leaf seal according to the present invention, being a cross-sectional view from the cross-sectional face which passes the axial line of the rotary shaft.

FIG. 14 is a cross-sectional view of the leaf seal 25 from the cross-sectional face which passes the axial line of the rotary shaft 23.

As shown in FIG. 14, in this embodiment, in addition to the first step section 50 described in the eleventh embodiment, the thin plate for minutely adjusting the high pressure side gap 35 of the third embodiment described above in FIG. 5B is provided between the high pressure side side-plate 27 and the thin plates 29.

According to this constitution, in the case when gas pressure from the high pressure side side-plate 27 to the low pressure side side-plate 26 has been applied to the thin plates 29, the distribution of gas pressure against the top and bottom faces of the thin plates 29 is shaped so that the gas pressure is highest at the angular section r1 on the tip side of the thin plates 29 and on the high pressure side side-plate 27, and gradually weakens as it approaches the diagonally opposite angular section r2.

According to the leaf seal 25 of the embodiment described above and a gas turbine equipped with the shaft seal 25, the same effects of the eleventh embodiment and the third embodiment can be obtained.

(Thirteenth Embodiment)

A thirteenth embodiment of this invention will be explained with reference to FIG. 15. This embodiment corresponds to a modification of the twelfth embodiment, and the explanation will center on the points of difference with the twelfth embodiment; parts which are identical to those in the twelfth embodiment will not be explained further.

Figure 15:
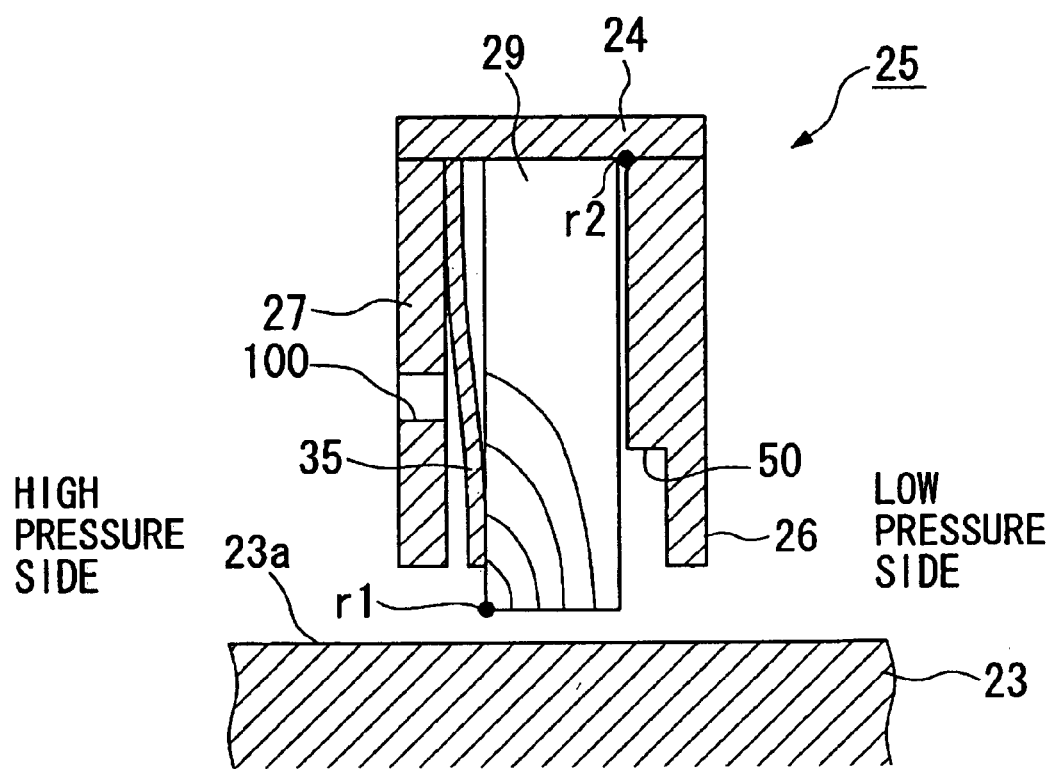
FIG. 15 shows a thirteenth embodiment of a leaf seal according to the present invention, being a cross-sectional view from the cross-sectional face which passes the axial line of the rotary shaft.
Figure 16A:
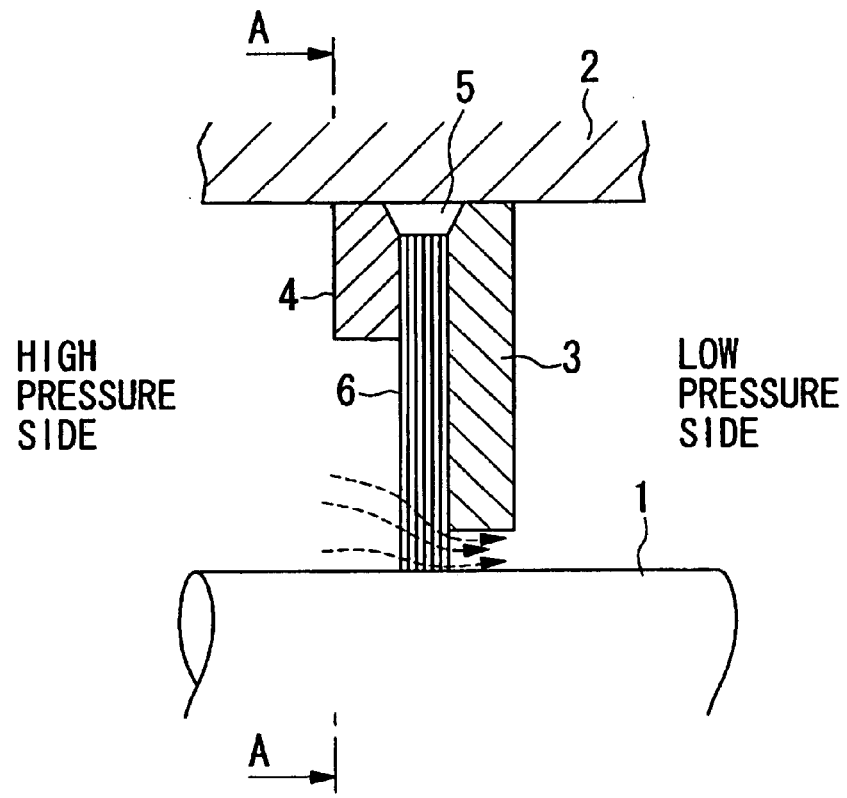
FIGS. 16A and 16B show one example of a conventional shaft seal, FIG. 16A being a cross-sectional view from the cross-sectional face which passes the axial line of the rotary shaft, and FIG. 16B being a cross-sectional view taken along the line A—A of FIG. 16A.
Figure 16B:
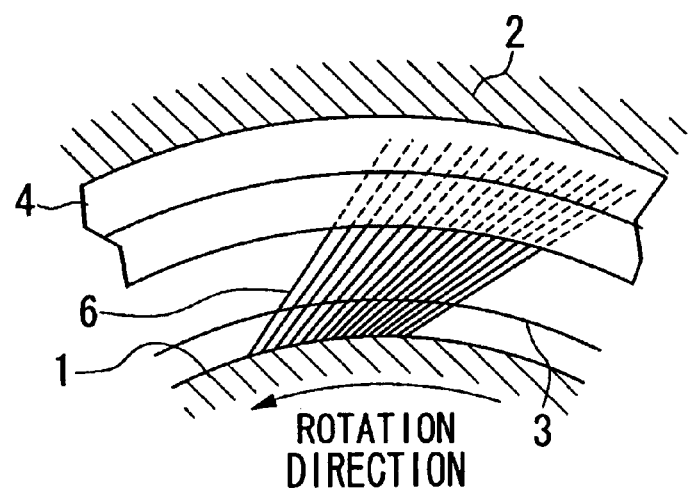
Figure 17:
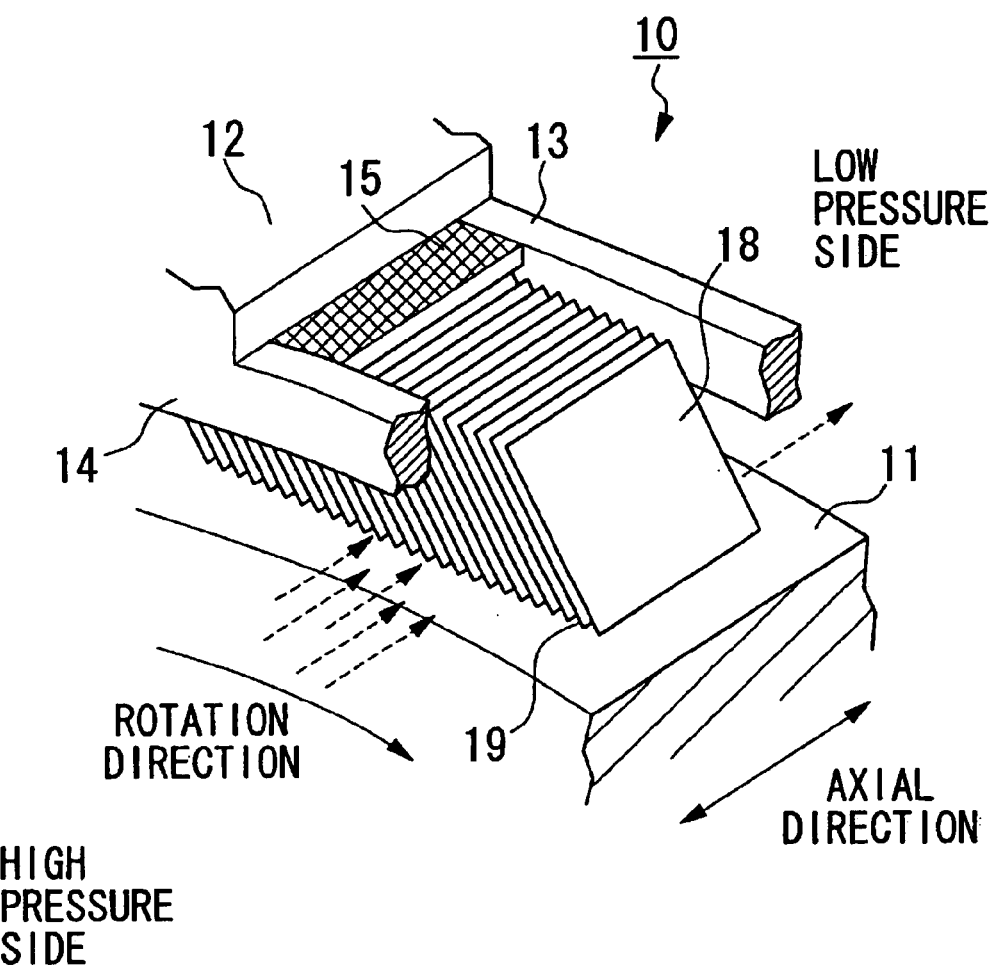
FIG. 17 is a perspective view of another example of a conventional shaft seal.

FIG. 15 is a cross-sectional view of the leaf seal 25 from the cross-sectional face which passes the axial line of the rotary shaft 23.

As shown in FIG. 15, in this embodiment, a lead-pressure hole 100 is provided in the high pressure side side-plate 27 of the twelfth embodiment and leads in the axial direction of the rotary shaft 23; a plurality of the lead-pressure holes 100 are provided in the perimeter direction.

According to this constitution, part of the gas at the high pressure side can be applied to the thin plate for minutely adjusting the high pressure side gap 35 by passing via the lead-pressure holes 100 and the high pressure side side-plate 27. Therefore, the thin plate for minutely adjusting the high pressure side gap 35 can be more effectively bent. Consequently, the effects of the twelfth embodiment can be more reliably obtained.

According to the leaf seal 25 of the embodiment described above and a gas turbine equipped with the shaft seal 25, the same effects of the twelfth embodiment can be more reliably obtained.

The leaf seal, i.e., the shaft seal of the first to the thirteenth embodiments described above apply not only in a conventional gas turbine which obtains dynamic force from the rotation of a turbine axis by using combustible gas, but also to a gas turbine engine for air plane use, and the like. The gas turbine of the present invention can also be applied in fluid machines such as a vapor turbine which uses steam vapor.

Further, the shaft seal of this invention can also be applied in various types of fluid machines, such as a gas turbine, a gas turbine engine, a vapor turbine, and the like.

The leaf seal 25 and the gas turbine comprising the leaf seal 25 of the third and fourth embodiments may comprise combinations of the gap size adjusting mechanism 50, 50A, 50B, and 50C described above. In this case, the same effects can, of course, be obtained by using the gap size adjusting mechanism 50, 50A, 50B, and 50C.

What is claimed is:

1. A shaft seal comprising:

a plurality of flexible thin plates having a width in an axial direction of a rotary shaft, said rotary shaft having an outer periphery, tips of said thin plates sliding against a peripheral face of said rotary shaft, and outer peripheral bases of said thin plates being secured to a casing side maintaining a gap therebetween, said thin plates being laminated in a peripheral direction of said rotary shaft, sealing the outer periphery of said rotary shaft, an acute angle formed between the thin plates and the peripheral face of said rotary shaft;

a low pressure side side-plate and a high pressure side side-plate provided on both sides of said thin plates in the axial direction of said rotary shaft;

a gas pressure adjusting mechanism, which when said thin plates are viewed cross-sectionally along an imaginary plane is perpendicular to a direction of the width of said thin plates, a face of each thin plate facing the rotary shaft is deemed a bottom face and a rear side is deemed a top face, and gas pressure from said high pressure side side-plate to said low pressure side side-plate is applied to said thin plates, ensuring that a gas pressure applied to said bottom face is higher than a gas pressure applied to said top face at a given point along a cross-sectional face of said thin plates, wherein said gas pressure adjusting mechanism comprises said low pressure side side-plate and said high pressure side side-plate, which are positioned so that the a size of a low pressure side gap between said thin plates and said low pressure side side-plate is larger than a high pressure side gap between said thin plates and said high pressure side side-plate, wherein said gas pressure adjusting mechanism comprises a flexible plate, which is flexible in the axial direction of said rotary shaft and is arranged on the a high pressure side of said thin plates, said flexible plate being configured such that a top end contacts the high pressure side side-plate and is spaced from said thin plates and a bottom end biases said thin plates and is spaced from the high pressure side side-plate, and wherein said gas pressure adjusting mechanism makes the gas, said gas entering from between the high pressure side side-plate and the peripheral face of the rotary shaft, flow along the top and bottom faces of the thin plates and spread to a diagonally opposite angle, and said gas pressure adjusting mechanism simultaneously makes a low pressure region expand at the outer peripheral base of said thin plates.

2. A gas turbine which leads gas of high temperature and high pressure into a casing and blows it against moving blades, which are rotatably supported inside the casing, thereby converting the thermal energy of said gas to mechanical rotation energy and generating dynamic force, wherein said gas turbine comprises said shaft seal according to claim 1.

3. A shaft seal according to claim 1, wherein said gas pressure adjusting mechanism makes a gas pressure distribution such that the gas pressure is highest at the angular section, which is positioned at said tip side and on the side of said high pressure side side-plate, and gradually weakens as it approaches a diagonally opposing angle.

4. A gas turbine which leads gas of high temperature and high pressure into a casing and blows it against moving blades, which are rotatably supported inside the casing, thereby converting the thermal energy of said gas to mechanical rotation energy and generating dynamic force,
 wherein said gas turbine comprising said shaft seal according to claim 2.

5. A shaft seal according to claim 1, further comprising a gap size adjusting mechanism provided between the low pressure side side-plate and the thin plates, for supporting the thin plates and maintaining the size of a gap between said low pressure side side-plate and the thin plates when the thin plates attempt to move toward the low pressure side side-plate.

6. A shaft seal as described in claim 5, wherein said gap size adjusting mechanism comprises a first step section provided on the side of said low pressure side side-plate so as to protrude toward the thin plates side; and said first step section forming a ring which runs along the low pressure side side-plate around said rotary shaft.

7. A shaft seal according to claim 6, wherein said first step section is provided along a radial direction of said low pressure side side-plate to the position of said casing.

8. A shaft seal according to claim 7, comprising pressure-leading holes passing through said high pressure side side-plate in the axial direction of said rotary shaft.

* * * * *